United States Patent
Kikuchi et al.

(10) Patent No.: US 11,108,041 B2
(45) Date of Patent: Aug. 31, 2021

(54) NONAQUEOUS ELECTROLYTE ENERGY STORAGE DEVICE AND METHOD FOR PRODUCING THE SAME

(71) Applicant: GS Yuasa International Ltd., Kyoto (JP)

(72) Inventors: Akifumi Kikuchi, Kyoto (JP); Ryota Kido, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 192 days.

(21) Appl. No.: 16/466,947

(22) PCT Filed: Dec. 7, 2017

(86) PCT No.: PCT/JP2017/044055
§ 371 (c)(1),
(2) Date: Jun. 5, 2019

(87) PCT Pub. No.: WO2018/105701
PCT Pub. Date: Jun. 14, 2018

(65) Prior Publication Data
US 2020/0067140 A1    Feb. 27, 2020

(30) Foreign Application Priority Data

Dec. 8, 2016   (JP) ............................. JP2016-238489
Feb. 2, 2017   (JP) ............................. JP2017-017662

(Continued)

(51) Int. Cl.
*H01M 4/505*   (2010.01)
*H01M 4/131*   (2010.01)
(Continued)

(52) U.S. Cl.
CPC ........... *H01M 4/505* (2013.01); *H01M 4/131* (2013.01); *H01M 4/1391* (2013.01);
(Continued)

(58) Field of Classification Search
CPC .... H01M 4/131; H01M 4/505; H01M 4/5805; H01M 4/62
(Continued)

(56) References Cited

U.S. PATENT DOCUMENTS

2007/0224506 A1   9/2007  Ooyama
2007/0292764 A1  12/2007  Soma
(Continued)

FOREIGN PATENT DOCUMENTS

EP    3389119 A1    10/2018
JP    H09199112 A    7/1997
(Continued)

OTHER PUBLICATIONS

European Search Report dated Jun. 12, 2020 issued in the corresponding EP17879543.
(Continued)

*Primary Examiner* — James M Erwin
(74) *Attorney, Agent, or Firm* — Rankin, Hill & Clark LLP

(57) ABSTRACT

Provided are a nonaqueous electrolyte energy storage device having high capacity retention ratio after charge-discharge cycles at a high temperature of about 45° C., and a method for producing such a nonaqueous electrolyte energy storage device. One aspect of the present invention is a nonaqueous electrolyte energy storage device including a positive electrode having a positive composite that contains a phosphorus atom and a lithium-transition metal composite oxide containing manganese, wherein, in a spectrum of the positive composite by X-ray photoelectron spectroscopy, a peak (Continued)

position for P2p is observed at 134.7 eV or less. Another aspect of the present invention is a method for producing a nonaqueous electrolyte energy storage device, the method including forming a positive electrode using a positive composite paste that contains a phosphorus oxo acid and a lithium-transition metal composite oxide containing manganese.

12 Claims, 1 Drawing Sheet

(30) Foreign Application Priority Data

Feb. 2, 2017 (JP) .............................. JP2017-017667
Feb. 10, 2017 (JP) .............................. JP2017-023006

(51) Int. Cl.
*H01M 4/1391* (2010.01)
*H01M 4/62* (2006.01)
*H01M 4/58* (2010.01)
*H01M 10/0567* (2010.01)

(52) U.S. Cl.
CPC ........... *H01M 4/5805* (2013.01); *H01M 4/62* (2013.01); *H01M 10/0567* (2013.01)

(58) Field of Classification Search
USPC ........................................................ 429/332
See application file for complete search history.

(56) References Cited

U.S. PATENT DOCUMENTS

| | | | |
|---|---|---|---|
| 2008/0032194 A1 | 2/2008 | Nakai | |
| 2008/0254368 A1 | 10/2008 | Ooyama | |
| 2008/0261117 A1 | 10/2008 | Iwanaga | |
| 2009/0123839 A1 | 5/2009 | Soma | |
| 2009/0123851 A1 | 5/2009 | Soma | |
| 2010/0233542 A1 | 9/2010 | Endo | |
| 2011/0240913 A1 | 10/2011 | Kim | |
| 2013/0171521 A1 | 7/2013 | Sugimoto | |
| 2013/0219703 A1 | 8/2013 | Mitsuhashi | |
| 2013/0313471 A1 | 11/2013 | Endo et al. | |
| 2014/0306151 A1 | 10/2014 | Endo | |
| 2014/0315097 A1* | 10/2014 | Tan | H01M 4/362 429/300 |
| 2015/0364794 A1 | 12/2015 | Nakazawa | |
| 2016/0079629 A1* | 3/2016 | Abe | H01M 4/525 429/331 |
| 2016/0111713 A1 | 4/2016 | Yamazaki | |
| 2016/0293944 A1 | 10/2016 | Yoon | |
| 2017/0077553 A1 | 3/2017 | Hiraoka | |
| 2017/0117544 A1 | 4/2017 | Endo et al. | |
| 2018/0076476 A1 | 3/2018 | Wakita | |

FOREIGN PATENT DOCUMENTS

| | | | |
|---|---|---|---|
| JP | 2001256966 A | 9/2001 |
| JP | 2007258095 A | 10/2007 |
| JP | 2007335331 A | 12/2007 |
| JP | 2008027778 A | 2/2008 |
| JP | 2008066019 A | 3/2008 |
| JP | 2008243810 A | 10/2008 |
| JP | 2008251434 A | 10/2008 |
| JP | 2009087885 A | 4/2009 |
| JP | 2009123463 A | 6/2009 |
| JP | 2009123464 A | 6/2009 |
| JP | 2010086690 A | 4/2010 |
| JP | 2010118179 A | 5/2010 |
| JP | 2010205436 A | 9/2010 |
| JP | 2010282874 A | 12/2010 |
| JP | 2011216485 A | 10/2011 |
| JP | 2012-151083 A | 8/2012 |
| JP | 2012160463 A | 8/2012 |
| JP | 2012-182071 A | 9/2012 |
| JP | 2013073724 A | 4/2013 |
| JP | 2013152825 A | 8/2013 |
| JP | 2013175325 A | 9/2013 |
| JP | 2014063594 A | 4/2014 |
| JP | 2014067700 A | 4/2014 |
| JP | 2014086221 A | 5/2014 |
| JP | 2014194930 A | 10/2014 |
| JP | 2014199827 A | 10/2014 |
| JP | 2015022896 A | 2/2015 |
| JP | 2015092477 A | 5/2015 |
| JP | 2016053159 A | 4/2016 |
| JP | 2016081738 A | 5/2016 |
| JP | 2016-126976 A | 7/2016 |
| JP | 2016126979 A | 7/2016 |
| JP | 2016154061 A | 8/2016 |
| JP | 2016532253 A | 10/2016 |
| JP | 2017152275 A | 8/2017 |
| WO | 2012036260 A1 | 3/2012 |
| WO | 2013/084923 A1 | 6/2013 |
| WO | 2013100081 A1 | 7/2013 |
| WO | 2015136922 A1 | 9/2015 |
| WO | 2015146649 A1 | 10/2015 |

OTHER PUBLICATIONS

International Search Report dated Feb. 20, 2018 filed in PCT/JP2017/044055.

* cited by examiner

NONAQUEOUS ELECTROLYTE ENERGY STORAGE DEVICE AND METHOD FOR PRODUCING THE SAME

TECHNICAL FIELD

The present invention relates to a nonaqueous electrolyte energy storage device and a method for producing the same.

BACKGROUND ART

Nonaqueous electrolyte secondary batteries typified by lithium ion secondary batteries are heavily used in electronic devices such as personal computers and communication terminals, automobiles, and the like because of their high energy density. The nonaqueous electrolyte secondary battery generally has a pair of electrodes electrically isolated by a separator, and a nonaqueous electrolyte interposed between the electrodes, and is charged and discharged by delivery of ions between both the electrodes. As nonaqueous electrolyte energy storage devices other than nonaqueous electrolyte secondary batteries, capacitors such as lithium ion capacitors and electric double layer capacitors are also widely used.

Conventionally, as a positive active material for nonaqueous electrolyte energy storage devices, a lithium-transition metal composite oxide having an $\alpha$-$NaFeO_2$ type crystal structure has been studied, and a nonaqueous electrolyte secondary battery containing $LiCoO_2$ has been widely put to practical use. However, $LiCoO_2$ has a discharge capacity of only about 120 to 130 mAh/g. Moreover, it has also been desired to use Mn that is an abundant earth resource as a transition metal element.

Under such circumstances, various "$LiMeO_2$ type" active materials having a molar ratio (Mn/Me) of Mn to a transition metal (Me) of 0.5 or less and a molar ratio of Li to the transition metal (Me), Li/Me, of approximately 1 have been proposed, and some of them have been put to practical use (see Patent Document 1). For example, a positive active material containing $LiNi_{1/2}Mn_{1/2}O_2$ or $LiNi_{1/3}Co_{1/3}Mn_{1/3}O_2$ has a discharge capacity of 150 to 180 mAh/g.

Meanwhile, there are also known so-called "lithium-excess type" active materials that, unlike the "$LiMeO_2$ type" active materials, have a molar ratio of Mn to Me, Mn/Me, larger than 0.5, and a composition ratio (Li/Me) of lithium (Li) to the transition metal (Me) larger than 1 (see Patent Document 2).

PRIOR ART DOCUMENTS

Patent Documents

Patent Document 1: JP-A-2011-216485
Patent Document 2: JP-A-2010-086690

SUMMARY OF THE INVENTION

Problem to be Solved by the Invention

The inventors have found that nonaqueous electrolyte energy storage devices containing, as a positive active material, a lithium-transition metal composite oxide containing Mn as a transition metal element are insufficient in charge-discharge cycle performance particularly under high-voltage conditions or high-temperature conditions. Moreover, also in nonaqueous electrolyte energy storage devices containing other positive active materials, improvement in, for example, the capacity retention ratio after charge-discharge cycles at a high temperature of about 45° C. is desired.

The present invention has been made in view of the circumstances as described above, and an object thereof is to provide a nonaqueous electrolyte energy storage device having high capacity retention ratio after charge-discharge cycles at a high temperature of about 45° C., and a method for producing such a nonaqueous electrolyte energy storage device.

Means for Solving the Problem

One aspect of the present invention for solving the above-mentioned problem is a nonaqueous electrolyte energy storage device including a positive electrode having a positive composite that contains a phosphorus atom and a lithium-transition metal composite oxide containing manganese, wherein, in a spectrum of the positive composite by X-ray photoelectron spectroscopy, a peak position for P2p is observed at 134.7 eV or less.

Another aspect of the present invention is a method for producing a nonaqueous electrolyte energy storage device, the method including forming a positive electrode using a positive composite paste that contains a phosphorus oxo acid and a lithium-transition metal composite oxide containing manganese.

Another aspect of the present invention is a nonaqueous electrolyte energy storage device including a conductive substrate, and a positive electrode having a positive composite and stacked on the conductive substrate, wherein the positive composite contains a positive active material, a fluororesin binder, a basic substance, and a phosphorus atom, and in a spectrum of the positive composite by X-ray photoelectron spectroscopy, a peak position for P2p is observed at 134.7 eV or less.

Another aspect of the present invention is a nonaqueous electrolyte energy storage device including: a positive electrode having a positive composite containing a phosphorus atom; and a nonaqueous electrolyte containing a fluorinated carbonate, wherein, in a spectrum of the positive composite by X-ray photoelectron spectroscopy, a peak position for P2p is observed at 134.7 eV or less, and the nonaqueous electrolyte has a content of the fluorinated carbonate of 15 mass % or less.

Another aspect of the present invention is a nonaqueous electrolyte energy storage device including a positive electrode having a positive composite that contains a lithium-transition metal composite oxide and a phosphorus atom, wherein the lithium-transition metal composite oxide has an $\alpha$-$NaFeO_2$ type crystal structure, the molar ratio (Li/Me) of lithium (Li) to a transition metal (Me) is larger than 1, the transition metal contains manganese (Mn), the molar ratio (Mn/Me) of manganese to the transition metal is larger than 0.5, and in a spectrum of the positive composite by X-ray photoelectron spectroscopy, the peak height ratio ($Mn2p_{3/2}$/P2p) of $Mn2p_{3/2}$ to P2p is 2 or less.

Advantages of the Invention

According to the present invention, it is possible to provide a nonaqueous electrolyte energy storage device having high capacity retention ratio after charge-discharge cycles at a high temperature of about 45° C., and a method for producing such a nonaqueous electrolyte energy storage device.

MODE FOR CARRYING OUT THE INVENTION

Figure 1:
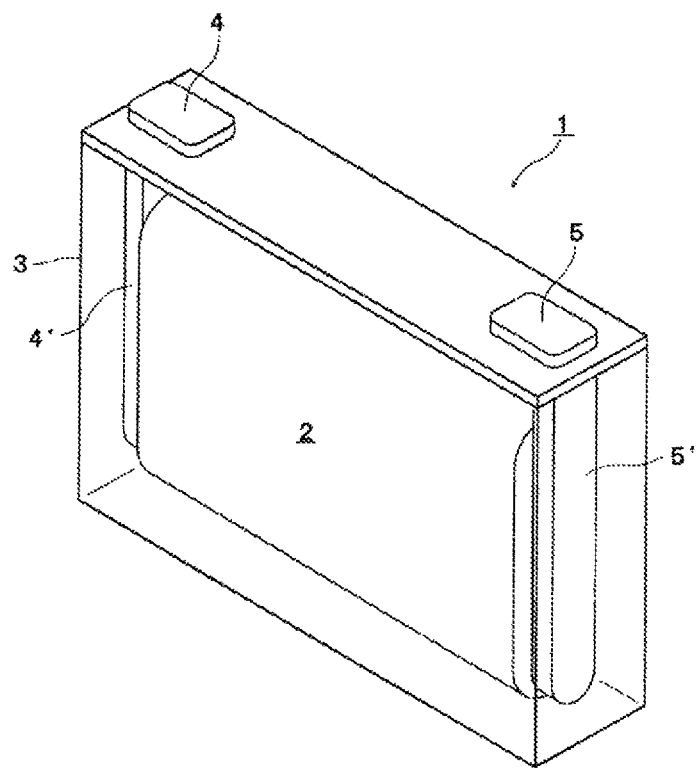
FIG. 1 is an external perspective view showing a nonaqueous electrolyte energy storage device according to one embodiment of the present invention.

A nonaqueous electrolyte energy storage device (hereinafter sometimes simply referred to as "energy storage device") according to one embodiment of the present invention includes a positive electrode having a positive composite that contains a phosphorus atom and a lithium-transition metal composite oxide containing manganese, and in a spectrum of the positive composite by X-ray photoelectron spectroscopy, a peak position for P2p is observed at 134.7 eV or less.

The energy storage device has high capacity retention ratio after charge-discharge cycles. Although the reason for the high capacity retention ratio is not clear, the reason is presumably as follows. One of the causes of low discharge capacity in conventional nonaqueous electrolyte energy storage devices is elution of positive active material components such as a manganese-containing compound from the positive electrode due to a minute amount of active species present in the nonaqueous electrolyte, such as hydrogen fluoride (HF). The eluted positive active material components are deposited on the negative electrode surface, which leads to an increase in the amount of side reactions of the negative electrode. It is presumed that these reactions result in an increase in resistance, or a decrease in discharge capacity due to a shift in the capacity balance. It is also presumed that the minute amount of HF in the nonaqueous electrolyte is generated, for example, by decomposition of a fluorine atom-containing electrolyte salt in the vicinity of the positive electrode, and that the amount of the generated HF increases with an increase in the positive electrode potential. Meanwhile, in the energy storage device according to one embodiment of the present invention, a peak of P2p that appears within the range of 134.7 eV or less in the above-mentioned spectrum is a peak of a phosphorus atom derived from a phosphorus oxo acid such as phosphonic acid. That is, the above-mentioned peak indicates that a phosphorus atom derived from a phosphorus oxo acid is present on the positive composite surface, and it is presumed that the phosphorus atom forms a film on the positive composite surface. In the energy storage device, this film suppresses the decomposition reaction of the fluorine atom-containing electrolyte salt on the positive composite surface and also suppresses the elution of Mn, and can consequently increase the capacity retention ratio.

A sample used for the measurement of the spectrum of the positive composite by X-ray photoelectron spectroscopy (XPS) is prepared by the following method. A nonaqueous electrolyte energy storage device is discharged at a current of 0.1 C to an end-of-discharge voltage in normal use of the energy storage device so that the energy storage device is brought into an end-of-discharge state. Here, "normal use" refers to a case where the energy storage device is used under discharge conditions recommended or designated for the energy storage device. The energy storage device in the end-of-discharge state is disassembled, and the positive electrode is taken out, sufficiently washed with dimethyl carbonate, and then dried under reduced pressure at room temperature. The dried positive electrode is cut into a predetermined size (for example, 2×2 cm) and used as a sample in XPS spectrum measurement. The operation from disassembly of the energy storage device to XPS measurement is performed in an argon atmosphere with a dew point of −60° C. or lower. The apparatus and measurement conditions used in the XPS spectrum measurement of the positive composite are as follows.

Apparatus: "AXIS NOVA" manufactured by Kratos Analytical Ltd.
X-ray source: monochromated AlKα
Acceleration voltage: 15 kV
Analyzed area: 700 μm×300 μm
Measurement range: P2p=142 to 125 eV, $Mn2p_{3/2}$=660 to 634.8 eV, C1s=300 to 272 eV
Measurement interval: 0.1 eV
Measurement time: P2p=72.3 seconds/time, $Mn2p_{3/2}$=60.2 seconds/time, C1s=70.0 seconds/time
Cumulative number: P2p=15 times, $Mn2p_{3/2}$=15 times, C1s=8 times
Relative sensitivity factor: P2p=1.19, $Mn2p_{3/2}$=13.9. C1s=1

The peak height and peak position in the above-mentioned spectrum are values determined as follows using CasaXPS (manufactured by Casa Software Ltd.). First, a C1s is peak of sp2 carbon is defined as 284.8 eV and all the obtained spectra are corrected. Then, each of the spectra is leveled by removing the background using a linear method. The leveled spectrum of each of the elements is corrected using the above-mentioned relative sensitivity factor, and the value with the highest peak intensity is taken as the peak height. The binding energy at the peak height is taken as the peak position.

The lithium-transition metal composite oxide is preferably represented by $Li_{1+\alpha}Me_{1-\alpha}O_2$ wherein Me is a transition metal element containing Mn, and $0 \leq \alpha < 1$. A nonaqueous electrolyte energy storage device in which the lithium-transition metal composite oxide is the above-mentioned compound has remarkably high capacity retention ratio after charge-discharge cycles.

In formula $Li_{1+\alpha}Me_{1-\alpha}O_2$, preferably, $\alpha > 0$, and the molar ratio (Mn/Me) of Mn to Me is larger than 0.5. In this case, the lithium-transition metal composite oxide is a so-called "lithium-excess type" active material. An energy storage device containing the above-mentioned lithium-transition metal composite oxide more sufficiently exhibits an effect of improving the discharge capacity retention ratio.

It is preferable that the lithium-transition metal composite oxide have an $\alpha$-$NaFeO_2$ type crystal structure, and that in the spectrum of the positive composite, the peak height ratio ($Mn2p_{3/2}$/P2p) of $Mn2p_{3/2}$ to P2p be 2 or less. The fact that the peak height ratio ($Mn2p_{3/2}$/P2p) of $Mn2p_{3/2}$ to P2p is 2 or less in the spectrum of the positive composite by X-ray photoelectron spectroscopy means that a phosphorus atom-containing film sufficient for suppressing the side reactions is formed relative to the lithium-transition metal composite oxide containing manganese. Therefore, in this case, the energy storage device has higher capacity retention ratio. In particular, when the lithium-transition metal composite oxide is a lithium-excess type active material, this effect is more sufficiently exhibited.

The peak height ratio ($Mn2p_{3/2}$/P2p) is preferably 1 or less. A small peak height ratio ($Mn2p_{3/2}$/P2p) means that the content of phosphorus atoms in the formed film is high. A peak height ratio of 1 or less can achieve, in addition to the high capacity retention ratio, high initial discharge capacity itself and improved high rate discharge performance.

Although the reason for the improvement is not clear, the reason is presumably as follows: the phosphorus atom-containing film is more sufficiently formed on the positive composite surface, and the side reactions with the nonaqueous electrolyte are further suppressed. That is, it is presumed that suppression of the side reactions reduces the increase in resistance and improves the discharge capacity and the high rate discharge performance.

The positive composite preferably further contains a fluororesin binder and a basic substance. In this case, in the energy storage device, the adhesion between the positive composite and the substrate is improved, and the discharge capacity retention ratio after the energy storage device is stored in a charged state is also increased. Although the reason for the improvement is not clear, the reason is presumably as follows. In a general nonaqueous electrolyte energy storage device, the positive active material usually exhibits basicity. The basicity acts to desorb part of fluorine atoms of the fluororesin binder, and the fluororesin binder from which the fluorine atoms have been desorbed reacts with the substrate surface. As a result, the positive composite containing the fluororesin binder adheres to the substrate. However, when the positive composite contains an acid component such as phosphonic acid, a neutralization reaction weakens the basicity of the positive composite. Therefore, the desorption reaction of the fluorine atoms in the fluororesin binder does not easily occur, and the adhesion to the substrate is reduced. However, it is presumed that when a basic substance is added to the positive composite of the energy storage device, the positive composite maintains the basicity and exhibits high adhesion to the substrate.

The basic substance is preferably calcium-containing particles. Use of calcium-containing particles as the basic substance maintains good basicity of the positive composite, and thus can further improve the adhesion between the substrate and the positive composite.

It is preferable that the energy storage device further contain a nonaqueous electrolyte containing a fluorinated carbonate, and that the nonaqueous electrolyte have a content of the fluorinated carbonate of 15 mass % or less. In this case, the energy storage device has high capacity retention ratio in high-voltage charge-discharge cycles in high-temperature and low-temperature environments. Although the reason for the high capacity retention ratio is not clear, the reason is presumably as follows. In general, fluorinated carbonates are excellent in oxidation resistance. Therefore, use of a fluorinated carbonate is considered to improve the capacity retention ratio in operating the energy storage device at high voltage. Conventionally, in order to obtain the effect of improving the charge-discharge cycle performance exerted by a fluorinated carbonate, it is necessary to add a certain amount of a fluorinated carbonate. However, a large amount of a fluorinated carbonate contained in the energy storage device has a disadvantage that the energy storage device has low charge-discharge cycle performance in a low-temperature environment due to, for example, low dielectric constant of the fluorinated carbonate. In contrast, in the energy storage device, as described above, it is presumed that a film containing a phosphorus atom derived from a phosphorus oxo acid is formed on the positive composite surface. This film suppresses the decomposition reaction of the fluorine atom-containing electrolyte salt on the positive composite surface and also suppresses the elution of the positive active material components, and can consequently increase the capacity retention ratio in high-voltage charge-discharge cycles in high-temperature and low-temperature environments. Furthermore, because the nonaqueous electrolyte contains a fluorinated carbonate having high oxidation resistance, it is possible to suppress side reactions (such as oxidative decomposition of a nonaqueous solvent or the like) that may occur during charge-discharge of the energy storage device, and thus, the capacity retention ratio can be further improved. Meanwhile, since the content of the fluorinated carbonate is suppressed to 15 mass % or less, it is possible to achieve good capacity retention ratio even in a low-temperature environment.

The nonaqueous electrolyte preferably contains ethylene carbonate (EC). Conventionally, a decrease in the capacity retention ratio is triggered by the oxidative decomposition of the nonaqueous solvent. Particularly when a nonaqueous solvent containing EC, which is a high dielectric constant solvent, is used, the capacity retention ratio is largely decreased. However, in the energy storage device, even in the case where the nonaqueous electrolyte contains EC, the energy storage device has high capacity retention ratio in high-voltage charge-discharge cycles in high-temperature and low-temperature environments. Therefore, EC can be effectively used as a solvent.

In the energy storage device, in normal use of the energy storage device, the positive electrode preferably has an end-of-charge potential of 4.35 V (vs. Li/Li$^+$) or more. Since the energy storage device has high capacity retention ratio even in high-voltage charge-discharge cycles, the energy storage device can particularly sufficiently exhibit this effect in the case where it is a nonaqueous electrolyte energy storage device used under such charge conditions that the positive electrode has a relatively high potential at the end-of-charge voltage in normal use. Here, "normal use" refers to a case where the nonaqueous electrolyte energy storage device is used under charge conditions recommended or designated for the energy storage device. In the case where a charger for the energy storage device is provided, it is a case where the energy storage device is used with the charger. For example, in an energy storage device containing graphite as a negative active material, depending on the design, the positive electrode potential is about 5.1 V (vs. Li/Li$^+$) when the end-of-charge voltage is 5.0 V.

A method for producing a nonaqueous electrolyte energy storage device according to one embodiment of the present invention includes forming a positive electrode using a positive composite paste that contains a phosphorus oxo acid and a lithium-transition metal composite oxide containing manganese.

This production method can provide a nonaqueous electrolyte energy storage device having high capacity retention ratio after charge-discharge cycles. As described above, this effect is presumably exerted by the film formed on the positive composite surface from a phosphorus oxo acid.

The production method preferably includes producing the nonaqueous electrolyte energy storage device including the positive electrode by initial charge. In the production method, it is preferable that the lithium-transition metal composite oxide have an α-NaFeO$_2$ type crystal structure, the molar ratio (Li/Me) of lithium (Li) to a transition metal (Me) be larger than 1, the transition metal contain manganese (Mn), and the molar ratio (Mn/Me) of manganese to the transition metal be larger than 0.5. A nonaqueous electrolyte energy storage device containing a lithium-excess type active material has a feature that it has a high capacity when it is subjected to initial charge at a high positive electrode potential of, for example, 4.5 V (vs. Li/Li$^+$) or more in the production process. Also in this production method, it is possible to provide an energy storage device having high capacity retention ratio and containing a lithium-excess type active material by subjecting the energy storage device to initial charge. The reason is presumably that, as described above, forming a positive composite using a positive composite paste containing a phosphorus oxo acid can form a film capable of suppressing side reactions with a nonaqueous electrolyte. Here, "initial charge" refers to a process of performing first charge by which the positive electrode potential reaches 4.5 V (vs. Li/Li$^+$) or more after assembly of the energy storage device. The initial charge may be divided into a plurality of times.

The initial charge is preferably performed in a temperature environment of 35° C. or higher. Performing the initial charge at such a relatively high temperature can provide an energy storage device having high capacity retention ratio as well as high discharge capacity and improved high rate discharge performance. The reason is presumably that the initial charge performed at a relatively high temperature more sufficiently forms the phosphorus atom-containing film. That is, performing initial charge in an environment of relatively high temperature can further reduce the peak height ratio (Mn2p$^{3/2}$/P2p).

Moreover, usually, the speed of a reaction associated with the initial charge of an energy storage device containing a lithium-excess type active material is low. To deal with this problem, the temperature during the initial charge can be raised (to 35° C. or higher) to increase the reaction speed. In this case, however, in conventional energy storage devices, side reactions tend to occur at the interface between the positive composite and the nonaqueous electrolyte, resulting in deterioration of discharge capacity, capacity retention ratio, and high rate discharge performance of the obtained energy storage device. Therefore, the positive electrode before the initial charge is produced using a positive composite paste containing a phosphorus oxo acid, and the initial charge is performed in a temperature environment of 35° C. or higher. In this case, activation treatment can be sufficiently performed while suppressing the decomposition of the nonaqueous electrolyte in the initial charge, and an energy storage device having good discharge capacity, capacity retention ratio, and high rate discharge performance can be obtained.

The positive composite paste preferably further contains a fluororesin binder and a basic substance. In this way, it is possible to produce an energy storage device having high adhesion between the positive composite and the substrate as well as high capacity retention ratio after charge-discharge cycles even at high voltages. Moreover, a nonaqueous electrolyte energy storage device obtained by such a production method also has high discharge capacity retention ratio after being stored in a charged state.

The production method preferably further includes injecting, into a case, a nonaqueous electrolyte containing a fluorinated carbonate and having a content of the fluorinated carbonate of 15 mass % or less. In this way, it is possible to produce a nonaqueous electrolyte energy storage device having high capacity retention ratio in high-voltage charge-discharge cycles in high-temperature and low-temperature environments.

A nonaqueous electrolyte energy storage device according to one embodiment of the present invention includes a conductive substrate, and a positive electrode having a positive composite and stacked on the conductive substrate, the positive composite contains a positive active material, a fluororesin binder, a basic substance, and a phosphorus atom, and in a spectrum of the positive composite by X-ray photoelectron spectroscopy, a peak position for P2p is observed at 134.7 eV or less.

In addition to high capacity retention ratio after charge-discharge cycles, the energy storage device has high adhesion between the positive composite and the substrate.

A nonaqueous electrolyte energy storage device according to one embodiment of the present invention includes: a positive electrode having a positive composite containing a phosphorus atom; and a nonaqueous electrolyte containing a fluorinated carbonate, in a spectrum of the positive composite by X-ray photoelectron spectroscopy, a peak position for P2p is observed at 134.7 eV or less, and the nonaqueous electrolyte has a content of the fluorinated carbonate of 15 mass % or less.

The energy storage device has high capacity retention ratio in high-voltage charge-discharge cycles in high-temperature and low-temperature environments.

A nonaqueous electrolyte energy storage device according to one embodiment of the present invention includes a positive electrode having a positive composite that contains a lithium-transition metal composite oxide and a phosphorus atom, the lithium-transition metal composite oxide has an α-NaFeO$_2$ type crystal structure, the molar ratio (Li/Me) of lithium (Li) to a transition metal (Me) is larger than 1, the transition metal contains manganese (Mn), the molar ratio (Mn/Me) of manganese to the transition metal is larger than 0.5, and in a spectrum of the positive composite by X-ray photoelectron spectroscopy, the peak height ratio (Mn2p$_{3/2}$/P2p) of Mn2p$_{3/2}$ to P2p is 2 or less.

The energy storage device also has high capacity retention ratio in charge-discharge cycles.

Hereinafter, a nonaqueous electrolyte energy storage device according to one embodiment of the present invention, and a method for producing the nonaqueous electrolyte energy storage device will be described in detail.

<Nonaqueous Electrolyte Energy Storage Device>

An energy storage device according to one embodiment of the present invention includes a positive electrode, a negative electrode, and a nonaqueous electrolyte. Hereinafter, a nonaqueous electrolyte secondary battery will be described as an example of the nonaqueous electrolyte energy storage device. Usually, the positive electrode and the negative electrode are stacked or wound with a separator interposed therebetween to form an electrode assembly in which positive electrodes and negative electrodes are alternately superimposed on each other. The electrode assembly is housed in a case, and the case is filled with a nonaqueous electrolyte. The nonaqueous electrolyte is interposed between the positive electrode and the negative electrode. The case used may be a publicly known aluminum case, resin case or the like generally used as a case of a nonaqueous electrolyte secondary battery.

(Positive Electrode)

The positive electrode has a positive electrode substrate, and a positive composite layer disposed directly on the positive electrode substrate or with an intermediate layer interposed between the positive electrode substrate and the positive composite layer.

The positive electrode substrate has conductivity. Examples of the material of the substrate include metals such as aluminum, titanium, tantalum, and stainless steel, and alloys of these metals. Among them, aluminum and an aluminum alloy are preferable from the viewpoint of balance among high withstand voltage characteristics, high conductivity, and cost. Further, examples of the form of the formed positive electrode substrate include foil and a vapor-deposited film. Foil is preferable from the viewpoint of cost. That is, aluminum foil is preferable as the positive electrode substrate. Examples of aluminum or an aluminum alloy include A1085P and A3003P specified in JIS-H-4000 (2014).

The intermediate layer is a cover layer on the surface of the positive electrode substrate, and reduces the contact resistance between the positive electrode substrate and the positive composite layer because it contains conductive particles such as carbon particles. The structure of the intermediate layer is not particularly limited, and the intermediate layer can be formed from, for example, a composition containing a resin binder and conductive particles. Note that "having conductivity" means that the material has a volume resistivity measured in accordance with JIS-H-0505 (1975) of $10^7 \Omega \cdot cm$ or less, and that "non-conductive" means that the material has a volume resistivity more than $10^7 \Omega \cdot cm$.

The positive composite layer is a layer formed from a so-called positive composite containing a positive active material. In one aspect of the present invention, the positive composite contains a phosphorus atom and a lithium-transition metal composite oxide containing manganese. The lithium-transition metal composite oxide is the positive active material. The positive composite contains optional components such as a positive active material other than the lithium-transition metal composite oxide, a conductive agent, a binder (binding agent), a thickener, and a filler, if necessary. It is presumed that the phosphorus atom is present in the film that covers the positive active material.

The lithium-transition metal composite oxide contains manganese as a transition metal. The lower limit of the molar ratio (Mn/Me) of the content of manganese to the transition metal in the lithium-transition metal composite oxide may be 0.1 or 0.2. Furthermore, the molar ratio (Mn/Me) may be larger than 0.5, 0.51 or more, or 0.55 or more. A molar ratio (Mn/Me) equal to or larger than the lower limit tends to improve the charge-discharge cycle performance. On the other hand, the upper limit of the molar ratio (Mn/Me) is preferably 0.75, and may be 0.7, 0.5, or 0.4.

The lithium-transition metal composite oxide preferably further contains nickel, more preferably contains cobalt. Use of a lithium-transition metal composite oxide containing these transition metals can increase the discharge capacity.

The lithium-transition metal composite oxide may be a compound having a spinel type crystal structure such as $Li_xMn_2O_4$ and $Li_xNi_yMn_{(2-y)}O_4$, or a polyanion compound such as $LiMnPO_4$. A compound represented by $Li_{1+\alpha}Me_{1-\alpha}O_2$ wherein Me is a transition metal element containing Mn, and $0 \leq \alpha < 1$ is preferable, and a compound having an $\alpha$-NaFeO$_2$ type crystal structure and is represented by $Li_{1+\alpha}Me_{1-\alpha}O_2$ wherein Me is a transition metal element containing Mn, and $0 \leq \alpha < 1$ is particularly preferable. A compound having an $\alpha$-NaFeO$_2$ type crystal structure and is represented by $Li_{1+\alpha}Me_{1-\alpha}O_2$ wherein Me is a transition metal element containing Mn, and $0 \leq \alpha < 1$ is less likely to cause elution of the positive active material components such as the manganese-containing compound from the positive electrode compared to the compound having a spinel type crystal structure such as $Li_xMn_2O_4$ and $Li_xNi_yMn_{(2-y)}O_4$. Forming a film containing a phosphorus atom derived from a phosphorus oxo acid on the positive composite containing such an active material can provide a nonaqueous electrolyte energy storage device having remarkably excellent charge-discharge cycle performance at high temperatures.

The molar ratio (Li/Me) of Li to Me in the formula $Li_{1+\alpha}Me_{1-\alpha}O_2$ is represented by $(1+\alpha)/(1-\alpha)$. For example, when $\alpha=0.2$, the value of $(1+\alpha)/(1-\alpha)$ is 1.5.

Me in the formula preferably contains Ni or Co in addition to Mn, more preferably contains Ni and Co. Moreover, Me may be substantially composed of three elements of Mn, Ni, and Co. However, Me may contain other transition metal elements as long as the effects of the present invention are not impaired.

Hereinafter, preferable compositions will be separately described in detail for $LiMeO_2$ that is of "$LiMeO_2$ type" wherein Me contains Mn, and Mn/Me$\leq$0.5, and $Li_{1+\alpha}Me_{1-\alpha}O_2$ that is of "lithium-excess type" wherein Me contains Mn, Mn/Me>0.5, and $\alpha>0$.

($LiMeO_2$ Type)

The $LiMeO_2$ type lithium-transition metal composite oxide preferably has an $\alpha$-NaFeO$_2$ type crystal structure.

The lower limit of the molar ratio (Mn/Me) of Mn to Me in the formula ($LiMeO_2$) is preferably 0.1, more preferably 0.2. The upper limit of the molar ratio (Mn/Me) is 0.5, more preferably 0.4. A value of Mn/Me within the above-mentioned range improves the charge-discharge cycle performance.

In the formula, the molar ratio (Li/Me) of Li to Me, that is, $(1+\alpha)/(1-\alpha)$ is preferably 1.0 or more, and is preferably 1.1 or less. A value of Li/Me within the above-mentioned range improves the discharge capacity.

The lower limit of the molar ratio (Ni/Me) of Ni to Me in the formula is preferably 0.3, more preferably 0.33, and may be 0.4. The upper limit of the molar ratio (Ni/Me) may be 0.8, and is more preferably 0.7, particularly preferably 0.6. A value of Ni/Me within the above-mentioned range can provide a nonaqueous electrolyte energy storage device having high discharge capacity per mass and excellent charge-discharge cycle performance.

In the formula, the molar ratio (Co/Me) of Co to Me is preferably 0.1 to 0.6. A value of Co/Me of 0.6 or less can provide an inexpensive nonaqueous electrolyte energy storage device.

(Lithium-Excess Type)

The lithium-excess type lithium-transition metal composite oxide preferably has an $\alpha$-NaFeO$_2$ type crystal structure.

In the formula ($Li_{1+\alpha}Me_{1-\alpha}O_2$), the molar ratio (Mn/Me) of Mn to Me needs to be larger than 0.5, and is preferably 0.51 or more, more preferably 0.55 or more. On the other hand, the upper limit of the molar ratio (Mn/Me) is preferably 0.75, more preferably 0.70. A value of Mn/Me within the above-mentioned range improves the energy density.

In the formula, the molar ratio (Li/Me) of Li to Me, that is, $(1+\alpha)/(1-\alpha)$ needs to be larger than 1.0 ($\alpha>0$), and the lower limit thereof is preferably 1.15, more preferably 1.2. The upper limit thereof is preferably 1.6, more preferably 1.5. A value of Li/Me within the above-mentioned range improves the discharge capacity.

The lower limit of the molar ratio (Ni/Me) of Ni to Me in the formula is preferably 0.05, more preferably 0.10, still more preferably 0.15. On the other hand, the upper limit of the molar ratio (Ni/Me) is preferably 0.50, more preferably 0.45. A value of Ni/Me within the above-mentioned range improves the energy density.

The upper limit of the molar ratio (Co/Me) of Co to Me in the formula is preferably 0.3, more preferably 0.23, still more preferably 0.20. The molar ratio (Co/Me) may be 0.

(Method of Synthesizing Lithium-transition Metal Composite Oxide)

The lithium-transition metal composite oxide can be synthesized by various methods such as a solid phase method, a sol-gel method, a hydrothermal method, and a coprecipitation method. Among them, it is preferable to use a composite oxide synthesized by a coprecipitation method because the transition metal is highly uniformly distributed in the composite oxide. The coprecipitation method is a method of producing a precursor containing transition metals such as Mn, Ni, and/or Co by precipitation (coprecipitation) in an aqueous solution, and firing a mixture of the precursor and a lithium compound to synthesize the lithium-transition metal composite oxide. As the precursor obtained by the coprecipitation, a carbonate or a hydroxide can be employed.

In the $LiMeO_2$ type, use of a hydroxide precursor can provide a dense lithium-transition metal composite oxide having a moderately small specific surface area.

Also in the lithium-excess type, use of a hydroxide precursor can provide a lithium-transition metal composite oxide having a high density because the specific surface area is moderately small similarly to the case of the $LiMeO_2$ type. Alternatively, use of a carbonate precursor in the lithium-excess type can provide a precursor and an active material having high sphericity. Therefore, use of this active material makes it possible to produce a positive electrode having a uniform and highly smooth positive composite layer.

(Properties and the Like of Lithium-Transition Metal Composite Oxide)

The median diameter (D50) of the lithium-transition metal composite oxide is preferably 1 μm or more and 20 μm or less, more preferably 12 μm or less, still more preferably 10 μm or less. In particular, in the case of a lithium-transition metal composite oxide formed from a carbonate precursor, the lower limit of the median diameter is more preferably 5 μm. Alternatively, in the case of a lithium-transition metal composite oxide formed from a hydroxide precursor, the upper limit of the median diameter is more preferably 8 μm. Use of a lithium-transition metal composite oxide having a median diameter within the above-mentioned range can further increase the discharge capacity.

The "median diameter" of the lithium-transition metal composite oxide means a value at which the volume-based cumulative distribution calculated in accordance with JIS-Z-8819-2 (2001) is 50% (D50). Specifically, the median diameter can be a measured value obtained by the following method. The measurement is performed using a laser diffraction particle size distribution analyzer ("SALD-2200" manufactured by Shimadzu Corporation) as a measurement apparatus, and Wing SALD-2200 as measurement control software. A scattering type measurement mode is adopted, and a wet cell in which a dispersion liquid containing a measurement sample dispersed in a dispersion solvent circulates is irradiated with laser light. In this way, a scattered light distribution is obtained from the measurement sample. Then, the scattered light distribution is approximated by log-normal distribution, and the particle size corresponding to a cumulative frequency of 50% is defined as the median diameter (D50). It has been confirmed that the median diameter obtained by the above-mentioned measurement substantially agrees with a median diameter obtained by measuring 100 particles extracted from a SEM image excluding extremely large particles and extremely small particles. In the measurement of the SEM image, the Feret diameter of each particle is employed, and the volume of each particle is calculated as the volume of a sphere having, as the diameter, the Feret diameter.

The lithium-transition metal composite oxide preferably has the following differential pore volume. In the case of a lithium-transition metal composite oxide formed from a carbonate precursor, the pore diameter at which the differential pore volume obtained by the BJH method from an adsorption isotherm obtained by the nitrogen gas adsorption method exhibits the maximum value is within the range of 30 nm or more and 40 nm or less, and the peak differential pore volume in a pore region of 30 nm or more and 50 nm or less is preferably 0.85 $mm^3/(g \cdot nm)$ or more and 1.76 $mm^3/(g \cdot nm)$ or less. Meanwhile, in the case of a lithium-transition metal composite oxide formed from a hydroxide precursor, the pore diameter at which the differential pore volume obtained by the BJH method from an adsorption isotherm obtained by the nitrogen gas adsorption method exhibits the maximum value is within the range of 55 nm or more and 65 nm or less, and the peak differential pore volume in a pore region of 30 nm or more and 50 nm or less is preferably 0.50 $mm_3/(g \cdot nm)$ or less, more preferably 0.2 $mm^3/(g \cdot nm)$ or less, still more preferably 0.18 $mm^3/(g \cdot nm)$ or less, particularly preferably 0.12 $mm^3/(g \cdot nm)$ or less. A lithium-transition metal composite oxide having such a high density can be obtained by firing a high-density hydroxide precursor and a lithium compound. The upper limit of the total pore volume is preferably 0.05 $cm^3/g$, more preferably 0.04 $cm^3/g$. A total pore volume equal to or less than the upper limit can increase the discharge capacity per volume.

The total pore volume and the differential pore volume of the lithium-transition metal composite oxide are measured by the following method. Into a sample tube for measurement, 1.00 g of a powder as a measurement sample is charged, and the measurement sample is vacuum-dried at 120° C. for 12 hours to sufficiently remove the moisture therein. Then, isotherms for the adsorption and desorption are measured by the nitrogen gas adsorption method using liquid nitrogen at a relative pressure P/P0 (P0=about 770 mmHg) within the range of 0 to 1. Then, the pore distribution is evaluated by calculation according to the BJH method using the isotherm for the desorption, and the differential pore volume and the total pore volume are determined.

The lower limit of the tapped density of the lithium-transition metal composite oxide is preferably 1.2 $g/cm^3$, more preferably 1.6 $g/cm^3$, still more preferably 1.7 $g/cm^3$. A tapped density of the lithium-transition metal composite oxide equal to or more than the lower limit can improve the discharge capacity per volume, charge-discharge cycle performance, high rate discharge performance, and the like. On the other hand, the upper limit of the tapped density can be, for example, 3 $g/cm^3$.

The tapped density of the lithium-transition metal composite oxide is a value measured as follows: in a $10^{-2}$ $dm^3$ measuring cylinder, 2 g±0.2 g of a powder of a measurement sample is charged, the measurement sample is tapped 300 times using a tapping apparatus manufactured by REI ELECTRIC CO. LTD., and the volume of the measurement sample after the tapping is divided by the mass of the charged sample.

The lower limit of the BET specific surface area of the lithium-transition metal composite oxide is preferably 0.5 $m^2/g$, more preferably 1 $m^2/g$, sometimes still more preferably 3 $m^2/g$, sometimes further preferably 5 $m^2/g$. A BET specific surface area of the lithium-transition metal composite oxide equal to or more than the lower limit can increase the discharge capacity per volume. The upper limit of the BET specific surface area may be, for example, 20 $m^2/g$ or 10 $m^2/g$. The BET specific surface area is a value determined from the nitrogen adsorption amount by a single point method using a specific surface area measurement apparatus (trade name: MONOSORB) manufactured by Yuasa Ionics. In the measurement, gas adsorption by cooling using liquid nitrogen is performed. Further, preheating at 120° C. for 15 minutes is performed before cooling, and 0.5 g±0.01 g of a measurement sample is charged.

The composite oxide represented by $Li_{1+\alpha}Me_{1-\alpha}O_2$ usually has an $\alpha$-NaFeO$_2$ type crystal structure. The composite oxide preferably has a half width of the X-ray diffraction peak within the following range.

A lithium-excess type lithium-transition metal composite oxide formed from a carbonate precursor belongs to the hexagonal space group R3-m, and preferably has, on the X-ray diffraction diagram obtained using a CuK$\alpha$ tube, a half width of the diffraction peak at $2\theta=18.6°\pm1°$ (FWHM (003)) of 0.20° to 0.27° or/and a half width of the diffraction peak at $2\theta=44.1°\pm1°$ (FWHM (104)) of 0.26° to 0.39°. Half widths of the diffraction peaks within the above-mentioned ranges can increase the discharge capacity. The FWHM (104) is an index of crystallinity for all the orientations, and a smaller value of the FWHM (104) means that the crystallization is more advanced.

Meanwhile, in the case of a lithium-excess type lithium-transition metal composite oxide formed from a hydroxide precursor, the lower limit of the FWHM (104) is preferably 0.40°. An FWHM (104) equal to or more than the lower limit means that the crystallization does not proceed too much and the crystallites are not large, so that Li ions are sufficiently diffused and the initial efficiency is improved. On the other hand, the upper limit of the FWHM (104) is not particularly limited, and it is preferably 1.00°, more preferably 0.96°, particularly preferably 0.65° from the viewpoint of Li ion transport efficiency.

The half width of the lithium-transition metal composite oxide is measured using an X-ray diffractometer (manufactured by Rigaku Corporation, model name: MiniFlex II). Specifically, the measurement is performed in accordance with the following conditions and procedures. The radiation source is CuK$\alpha$, and the acceleration voltage and current are 30 kV and 15 mA, respectively. The sampling width is 0.01 deg, the scan time is 14 minutes (the scan speed is 5.0), the divergence slit width is 0.625 deg, the light receiving slit width is open, and the scattering slit is 8.0 mm. As for the obtained X-ray diffraction data, using "PDXL" that is the software attached to the above-mentioned X-ray diffractometer, in the space group R3-m, the half width FWHM (003) of the diffraction peak indexed to the (003) plane and appearing at $2\theta=18.6\pm1°$ on the X-ray diffraction diagram, and the half width FWHM (104) of the diffraction peak indexed to the (104) plane and appearing at $2\theta=44\pm1°$ on the X-ray diffraction diagram are determined. In the analysis of the X-ray diffraction data, the peak derived from K$\alpha$2 is not removed.

The sample to be subjected to the above-mentioned measurement of the half width is directly subjected to the measurement if it is an active material powder before the production of the positive electrode. In the case where a sample is collected from a positive electrode taken out of a disassembled energy storage device, the energy storage device before being disassembled is brought into a discharged state in accordance with the following procedure. First, constant current charge is performed at a current of 0.1 C to a voltage at which the positive electrode has a potential of 4.3 V (vs. Li/Li$^+$), and constant voltage charge is performed at the same voltage until the current value decreases to 0.01 C to bring the energy storage device into an end-of-charge state. After a pause of 30 minutes, constant current discharge is performed at a current of 0.1 C until the positive electrode has a potential of 2.0 V (vs. Li/Li$^+$) to bring the energy storage device into an end-of-discharge state. In the case of an energy storage device including a metal lithium electrode as a negative electrode, after the energy storage device is brought into an end-of-discharge state or an end-of-charge state, the positive electrode may be taken out of the disassembled energy storage device. Meanwhile, in the case of an energy storage device that does not include a metal lithium electrode as a negative electrode, for correctly controlling the positive electrode potential, after the energy storage device is disassembled and a positive electrode is taken out, an energy storage device including a metal lithium electrode as a counter electrode is assembled, and then the energy storage device is adjusted to an end-of-discharge state in accordance with the above-mentioned procedure.

The operation from disassembly of the energy storage device to the measurement is performed in an argon atmosphere with a dew point of −60° C. or lower. After the positive electrode is taken out, the positive electrode is thoroughly washed with dimethyl carbonate to remove the nonaqueous electrolyte attached to the positive electrode, dried at room temperature for one day and night, and then the positive composite is collected. The positive composite is fired at 600° C. for 4 hours using a small electric furnace to remove the conductive agent, binder, and the like, and lithium-transition metal composite oxide particles are taken out.

The positive active material may contain publicly known positive active materials other than the lithium-transition metal composite oxide containing manganese. The lower limit of the content of the lithium-transition metal composite oxide containing manganese in the entire positive active material is preferably 50 mass %, more preferably 70 mass %, still more preferably 90 mass %, further preferably 99 mass %. Moreover, the content of the positive active material in the positive active material layer can be, for example, 30 mass % or more and 95 mass % or less.

In one aspect of the present invention, as the positive active material, positive active materials other than the lithium-transition metal composite oxide containing manganese can be used. Examples of such positive active materials include composite oxides represented by $Li_xMO_y$ (wherein M represents at least one transition metal) (such as $Li_xCoO_2$, $Li_xNiO_2$, and $Li_xNi_\alpha Co_{(1-\alpha)}O_2$ having a layered $\alpha$-NaFeO$_2$ type crystal structure), and polyanion compounds represented by $Li_wMe_x(XO_y)_z$ (wherein Me represents at least one transition metal, and X represents P, Si, B, V or the like) (such as $LiFePO_4$, $LiNiPO_4$, $LiCoPO_4$, $Li_3V_2(PO_4)_3$, and $Li_2CoPO_4F$).

When a positive active material containing at least one of a nickel atom and a manganese atom among the positive active materials is used, the effects of the present invention can be exhibited more effectively. As described above, due to the minute amount of HF present in the nonaqueous electrolyte, the positive active material components are eluted from the positive composite layer to affect the capacity retention ratio and the like. When the positive active material is a nickel-containing compound or a manganese-containing compound, the above-mentioned elution tends to occur to affect the capacity retention ratio and the like. Therefore, covering the positive active material with the above-mentioned specific phosphorus atom-containing film can effectively suppress the elution of the nickel-containing compound or the manganese-containing compound.

(XPS Spectrum)

In one aspect of the present invention, in the spectrum of the positive composite layer (positive composite) by X-ray photoelectron spectroscopy, the peak position for P2p is observed at 134.7 eV or less, preferably at 134.5 eV or less, more preferably at 134.4 eV or less, still more preferably at 134.3 eV or less, sometimes further preferably at 134.2 eV or less. The peak position is preferably observed at 130 eV or more, more preferably at 132 eV or more, still more preferably at 133 eV or more, further preferably at 133.1 eV or more, even more preferably at 133.5 eV or more, sometimes even more preferably at 134.0 eV or more. When $LiMeO_2$ that is of "$LiMeO_2$ type" wherein Me contains Mn, and Mn/Me≤0.5 is used as the positive active material, the peak position for P2p is preferably observed at less than 134.0 eV, more preferably at 133.7 eV or less, still more preferably at 133.5 eV or less. When $Li_{1+\alpha}Me_{1-\alpha}O_2$ that is of "lithium-excess type" wherein Me contains Mn, Mn/Me>0.5, and α>0 is used as the positive active material, the peak position for P2p is preferably observed at 134.5 eV or less. Moreover, the peak position for P2p when the "lithium-excess type" is used is preferably observed at 133.5 eV or more, more preferably at 134.0 eV or more.

The peak of P2p appearing within the above-mentioned range is a peak of a phosphorus atom derived from a phosphorus oxo acid. Such a phosphorus atom is usually present on the surface of a particulate lithium-transition metal composite oxide. Such a phosphorus atom can suppress the generation of gases on the surface of the positive electrode and uniformize the discharge capacity. Note that the phosphorus atom is preferably present on the surface of the positive active material such as the lithium-transition metal composite oxide as a compound containing a $PO_3$ anion, a $PO_4$ anion, or a $PO_xF_y$, anion that results from substitution of part of oxygen atoms of a $PO_3$ anion or a $PO_4$ anion with fluorine atoms. In the spectrum by X-ray photoelectron spectroscopy, the peak of the phosphorus atom (P2p) of such a compound appears within the range of 133 eV or more and 134.7 eV or less. Further, in the above-mentioned spectrum, peaks outside the above-mentioned range may also be present. For example, a peak of a phosphorus atom derived from a fluoride of phosphorus is observed in the vicinity of 136 eV.

In the spectrum of the positive composite layer (positive composite) by X-ray photoelectron spectroscopy, the upper limit of the peak height ratio ($Mn2p_{3/2}$/P2p) of $Mn2p_{3/2}$ to P2p is preferably 2, more preferably 1.5, still more preferably 1.2, further preferably 1, particularly preferably 0.98. A peak height ratio ($Mn2p_{3/2}$/P2p) equal to or less than the upper limit makes it possible to form a sufficient phosphorus atom-containing film, further increase the capacity retention ratio, and moreover, increase the initial discharge capacity itself and improve the high rate discharge performance. On the other hand, the lower limit of the peak height ratio ($Mn2p_{3/2}$/P2p) is, for example, 0.5, preferably 0.7, more preferably 0.85.

The conductive agent is not particularly limited as long as it is a conductive material that does not adversely affect the performance of the energy storage device. Examples of the conductive agent include natural or artificial graphite, carbon black such as furnace black, acetylene black (AB), and ketjen black, metals, and conductive ceramics. AB is preferable. Examples of the shape of the conductive agent include powdery and fibrous shapes.

The lower limit of the content of the conductive agent in the positive composite is preferably 0.5 mass %, more preferably 1.0 mass %, still more preferably 1.2 mass %. The upper limit of the content of the conductive agent is preferably 20 mass %, more preferably 10 mass %, still more preferably 5 mass %. A content of the conductive agent within the above-mentioned range provides a positive composite paste that is stable and has high coatability when a phosphorus oxo acid is mixed in the positive composite paste. A content of the conductive agent equal to or less than the upper limit can suppress the excessive reaction between the conductive agent and the phosphorus oxo acid.

Examples of the binder (binding agent) include thermoplastic resins such as fluororesins, polyethylene, polypropylene, and polyimide; elastomers such as ethylene-propylene-diene rubber (EPDM), sulfonated EPDM, styrene-butadiene rubber (SBR), and fluororubber; and polysaccharide polymers.

In one aspect of the present invention, the binder is a fluororesin, and the positive composite further contains a basic substance. The fluororesin binder means a resin binder containing at least one fluorine atom in the structural unit. Examples of the fluororesin binder include polytetrafluoroethylene (PTFE), polyvinylidene fluoride (PVDF), polyvinyl fluoride (PVF), perfluoroalkoxy fluororesin (PFA), and ethylene-chlorotrifluoroethylene copolymer (ECTFE). Among them, PVDF is preferable.

The content of the fluororesin binder is not particularly limited, and can be 0.5 parts by mass or more and 5 parts by mass or less based on 100 parts by mass of the positive active material.

The basic substance is not particularly limited as long as it is a substance other than the positive active material and has basicity. Examples of the basic substance include hydroxides such as sodium hydroxide, potassium hydroxide, calcium hydroxide, and aluminum hydroxide; oxides such as potassium oxide, calcium oxide, and magnesium oxide; carbonates such as sodium carbonate, potassium carbonate, and calcium carbonate; and other organic compounds such as aniline and ammonia.

The basic substance is preferably an inorganic compound, more preferably a hydroxide, still more preferably a metal hydroxide. It is also preferable that the basic substance be a calcium-containing compound. The basic substance is particularly preferably calcium hydroxide.

The basic substance preferably has a particulate shape, and is more preferably calcium-containing particles. A particulate basic substance maintains good basicity of the positive composite, and thus can further improve the adhesion between the substrate and the positive composite.

The content of the basic substance is not particularly limited. The lower limit of the content based on 100 parts by mass of the positive active material is preferably 0.05 parts by mass, more preferably 0.1 parts by mass, still more preferably 0.2 parts by mass, further preferably 0.3 parts by mass. A content of the basic substance equal to or more than the lower limit can further improve the adhesion between the positive composite and the substrate. On the other hand, the upper limit of the content is, for example, preferably 5 parts by mass, more preferably 3 parts by mass, still more preferably 1 part by mass, further preferably 0.7 parts by mass. A content of the basic substance equal to or less than the upper limit can suppress extreme increase in the basicity of the positive composite layer, and exhibit better capacity retention ratio.

Examples of the thickener include polysaccharide polymers such as carboxymethylcellulose (CMC) and methylcellulose. When the thickener has a functional group reactive with lithium, it is preferable to previously deactivate the functional group by methylation or the like.

The filler is not particularly limited as long as it does not adversely affect the battery performance. Examples of the main component of the filler include polyolefins such as polypropylene and polyethylene, silica, alumina, zeolite, and glass.

The upper limit of the positive composite density is preferably 4.0 g/cm$^3$, more preferably 3.5 g/cm$^3$. The lower limit of the positive composite density is preferably 2.0 g/cm³, more preferably 2.3 g/cm³, still more preferably 2.7 g/cm³. A positive composite density within the above-mentioned range makes it possible to produce a stable positive electrode without peeling of the positive composite from the positive electrode substrate.

(Negative Electrode)

The negative electrode has a negative electrode substrate, and a negative composite layer disposed directly on the negative electrode substrate or with an intermediate layer interposed between the negative electrode substrate and the negative composite layer. The intermediate layer of the negative electrode can have the same structure as that of the intermediate layer of the positive electrode.

The negative electrode substrate can have the same structure as that of the positive electrode substrate. Examples of the material of the negative electrode substrate include metals such as copper, nickel, stainless steel, and nickel-plated steel, and alloys of these metals. Copper or a copper alloy is preferable. That is, copper foil is preferable as the negative electrode substrate. Examples of the copper foil include rolled copper foil and electrolytic copper foil.

The negative composite layer is formed from a so-called negative composite containing a negative active material. The negative composite that forms the negative composite layer contains optional components such as a conductive agent, a binder (binding agent), a thickener, and a filler, if necessary. The optional components used, such as the conductive agent, binding agent, thickener, and filler can be the same as those of the positive composite layer.

The negative active material used is usually a material that can occlude and release lithium ions. Specific examples of the negative active material include: metals and semimetals such as Si and Sn; metal oxides and semimetal oxides such as Si oxides and Sn oxides; polyphosphoric acid compounds; and carbon materials such as graphite and non-graphite carbon (easily graphitizable carbon and non-graphitizable carbon).

Further, the negative composite (negative composite layer) may contain typical nonmetal elements such as B, N, P, F, Cl, Br, and I, typical metal elements such as Li, Na, Mg, Al, K. Ca, Zn, Ga, and Ge, and transition metal elements such as Sc, Ti, V, Cr, Mn, Fe, Co, Ni, Cu, Mo, Zr, Ta, Hf, Nb, and W.

(Separator)

Examples of the material of the separator include a woven fabric, a nonwoven fabric, and a porous resin film. Among them, a porous resin film is preferable from the viewpoint of strength, and a nonwoven fabric is preferable from the viewpoint of the liquid retaining property of the nonaqueous electrolyte. The main component of the separator is preferably polyolefins such as polyethylene and polypropylene from the viewpoint of strength, and is preferably polyimide, aramid or the like from the viewpoint of resistance to oxidative decomposition. Further, these resins may be combined.

An inorganic layer may be provided between the separator and the electrode (usually, the positive electrode). The inorganic layer is a porous layer also called a heat-resistant layer or the like. Moreover, a separator having an inorganic layer formed on one surface of a porous resin film can also be used. The inorganic layer is usually formed from inorganic particles and a binder, and may contain other components. The inorganic particles are preferably $Al_2O_3$, $SiO_2$, aluminosilicate or the like.

(Nonaqueous Electrolyte)

As the nonaqueous electrolyte, a publicly known nonaqueous electrolyte usually used in a general nonaqueous electrolyte energy storage device can be used. The nonaqueous electrolyte contains a nonaqueous solvent, and an electrolyte salt dissolved in the nonaqueous solvent.

As the nonaqueous solvent, publicly known nonaqueous solvents usually used as a nonaqueous solvent in a general nonaqueous electrolyte for an energy storage device can be used. Examples of the nonaqueous solvent include cyclic carbonates, linear carbonates, esters, ethers, amides, sulfones, lactones, and nitriles. Among them, it is preferable to use at least a cyclic carbonate or a linear carbonate, and it is more preferable to use a cyclic carbonate and a linear carbonate in combination.

Examples of the cyclic carbonates include ethylene carbonate (EC), propylene carbonate (PC), butylene carbonate (BC), vinylene carbonate (VC), vinyl ethylene carbonate (VEC), styrene carbonate, catechol carbonate, 1-phenyl vinylene carbonate, and 1,2-diphenyl vinylene carbonate. Among them, EC is preferable. Some or all of the hydrogen atoms of the cyclic carbonate may be substituted or unsubstituted with a substituent or other elements.

The lower limit of the content of the linear carbonate in the nonaqueous solvent is preferably 10 vol %, more preferably 20 vol %, still more preferably 25 vol %. On the other hand, the upper limit of the content is preferably 70 vol %, more preferably 50 vol %, still more preferably 40 vol %. A content of the cyclic carbonate within the above-mentioned range can exhibit better charge-discharge cycle performance at high temperatures and low temperatures.

The linear carbonate has an effect of, for example, lowering the viscosity when used as a mixture with a cyclic carbonate such as EC. Examples of the linear carbonates include diethyl carbonate (DEC), dimethyl carbonate (DMC), ethyl methyl carbonate (EMC), and diphenyl carbonate. Among them, EMC and DMC are preferable. Some or all of the hydrogen atoms of the linear carbonate may be substituted or unsubstituted with a substituent or other elements.

In the case where a cyclic carbonate and a linear carbonate are used in combination, the lower limit of the volume ratio of the cyclic carbonate to the sum of the cyclic carbonate and the linear carbonate, cyclic carbonate/(cyclic carbonate+ linear carbonate), is preferably 10 vol %, more preferably 20 vol %, still more preferably 25 vol %. On the other hand, the upper limit of the volume ratio is preferably 70 vol %, more preferably 50 vol %, still more preferably 40 vol %.

The lower limit of the total content of the cyclic carbonate and the linear carbonate in the nonaqueous solvent is preferably 80 vol %, more preferably 95 vol %, still more preferably 99 vol % or more. The upper limit of the total content may be 100 vol %. Increasing the total content of the cyclic carbonate and the linear carbonate in the nonaqueous solvent as described above can further improve the charge-discharge cycle performance of the nonaqueous electrolyte energy storage device due to, for example, a moderate dielectric constant of the nonaqueous solvent and the nonaqueous electrolyte.

In one aspect of the present invention, the nonaqueous electrolyte contains a fluorinated carbonate as an additive. The fluorinated carbonate refers to a compound resulting from substitution of some or all of hydrogen atoms of the carbonate with fluorine atoms. The carbonate may be the linear carbonate or the cyclic carbonate described above.

The fluorinated carbonate is preferably a fluorinated cyclic carbonate. Examples of the fluorinated cyclic carbonate include fluorinated ethylene carbonate such as fluoroethylene carbonate (FEC) and difluoroethylene carbonate, fluorinated propylene carbonate, and fluorinated butylene carbonate. Fluorinated ethylene carbonate is preferable, and FEC is more preferable. The fluorinated carbonate may be a single compound or a mixture of two or more compounds.

The upper limit of the content of the fluorinated carbonate in the nonaqueous electrolyte in one aspect of the present invention is 15 mass %, preferably 10 mass %, more preferably 5 mass %, still more preferably 3 mass %. A content of the fluorinated carbonate equal to or less than the upper limit can suppress the decrease in the dielectric constant of the nonaqueous electrolyte, and can increase the capacity retention ratio particularly in high-voltage charge-discharge cycles in a low-temperature environment. On the other hand, the lower limit of the content of the fluorinated carbonate is, for example, preferably 0.1 mass %, more preferably 0.5 mass %, still more preferably 1 mass %. A content of the fluorinated carbonate equal to or more than the lower limit can sufficiently exhibit the effect of improving the capacity retention ratio exerted by the use of the fluorinated carbonate.

Examples of the electrolyte salt include lithium salts, sodium salts, potassium salts, magnesium salts, and onium salts. Lithium salts are preferable. Examples of the lithium salts include inorganic lithium salts such as $LiPF_6$, $LiPO_2F_2$, $LiBF_4$, $LiPF_2(C_2O_4)_2$, $LiClO_4$, and $LiN(SO_2F)_2$, and lithium salts having a fluorinated hydrocarbon group such as $LiSO_3CF_3$, $LiN(SO_2CF_3)_2$, $LiN(SO_2C_2F_5)_2$, $LiN(SO_2CF_3(SO_2C_4F_9)$, $LiC(SO_2CF_3)_3$, and $LiC(SO_2C_2F_5)_3$.

Use of a fluorine atom-containing electrolyte salt among the electrolyte salts further exhibits the effects of the present invention. As described above, HF in the nonaqueous electrolyte, which causes elution of the positive active material components, is generated, for example, by decomposition of the fluorine atom-containing electrolyte salt. In particular, HF is easily generated by decomposition of $LiPF_6$, $LiPO_2F_2$, $LiBF_4$, $LiPF_2(C_2O_4)_2$ or the like. Therefore, usually, use of these electrolyte salts easily causes a decrease in discharge capacity due to elution of the positive active material components. However, in the energy storage device, even when such a fluorine atom-containing electrolyte salt is used, generation of HF due to decomposition of the electrolyte salt can be suppressed, and thus a decrease in discharge capacity can be suppressed.

The lower limit of the content of the electrolyte salt in the nonaqueous electrolyte is preferably 0.1 mol/L, more preferably 0.3 mol/L, still more preferably 0.5 mol/L, particularly preferably 0.7 mol/L. On the other hand, the upper limit of the content is not particularly limited, and is preferably 2.5 mol/L, more preferably 2 mol/L, still more preferably 1.5 mol/L. In a nonaqueous electrolyte energy storage device including a positive composite having a film containing a phosphorus atom derived from a phosphorus oxo acid, a content of the electrolyte salt in the nonaqueous electrolyte within the above-mentioned range can provide a nonaqueous electrolyte energy storage device excellent in high rate discharge performance.

The nonaqueous electrolyte may contain other additives. The content of other additives other than the nonaqueous solvent, the electrolyte salt, and the fluorinated carbonate in the nonaqueous electrolyte can be, for example, 0.1 mass % or more and 10 mass % or less. However, the upper limit of the content of other additives in the nonaqueous electrolyte is sometimes preferably 5 mass %, sometimes more preferably 1 mass %, sometimes still more preferably 0.1 mass %. In addition, as the nonaqueous electrolyte, an ambient temperature molten salt, an ionic liquid, a polymer solid electrolyte, or the like can be used.

(End-Of-Charge Potential)

In the energy storage device, the lower limit of the end-of-charge potential of the positive electrode in normal use of the energy storage device is preferably 3.5 V (vs. $Li/Li^+$), more preferably 4.0 V (vs. $Li/Li^+$), still more preferably 4.35 V (vs. $Li/Li^+$), further preferably 4.4 V (vs. $Li/Li^+$), particularly preferably 4.5 V (vs. $Li/Li^+$). The upper limit thereof is, for example, 5.5 V (vs. $Li/Li^+$), and may be 5.1 V (vs. $Li/Li^+$) or 5.0 V (vs. $Li/Li^+$). Usually, the higher the end-of-charge potential of the positive electrode is, the more easily the cycle capacity retention ratio after charge-discharge decreases. Therefore, the energy storage device can more sufficiently exhibit the effect of improving the cycle capacity retention ratio after charge-discharge within the above-mentioned range of the end-of-charge potential. In addition, the energy storage device is also excellent in capacity retention ratio after charge-discharge cycles leading to such a high potential.

<Method for Producing Nonaqueous Electrolyte Energy Storage Device>

Although the energy storage device can be produced according to a combination of publicly known production methods, the energy storage device is preferably produced by the following method. That is, a method for producing a nonaqueous electrolyte energy storage device according to one embodiment of the present invention includes forming a positive electrode using a positive composite paste containing a phosphorus oxo acid (positive electrode production step). The method for producing the nonaqueous electrolyte energy storage device can include injecting a nonaqueous electrolyte into a case (nonaqueous electrolyte injection step). In addition, the method for producing the nonaqueous electrolyte energy storage device can include, when a lithium-excess type positive active material is used, initially charging the nonaqueous electrolyte energy storage device before the initial charge (initial charge step).

(Positive Electrode Production Step)

The positive composite paste usually further contains, in addition to the phosphorus oxo acid, a positive active material such as a lithium-transition metal composite oxide containing manganese, and a binder such as a fluororesin binder. The positive composite paste is obtained by mixing of these components. The positive composite paste is applied to the surface of the positive electrode substrate and dried to provide a positive electrode. The lithium-transition metal composite oxide and the like are as described above. Further, the positive composite paste may contain, other than these components, the above-mentioned optional components that may be contained in the positive composite, such as the basic substance.

The phosphorus oxo acid refers to a compound having a structure in which a hydroxyl group (—OH) and an oxy group (=O) are bonded to a phosphorus atom. Examples of the phosphorus oxo acid include phosphoric acid ($H_3PO_4$), phosphonic acid ($H_3PO_3$), phosphinic acid ($H_3PO_2$), pyrophosphoric acid ($H_4P_2O_7$), and polyphosphoric acid. The phosphorus oxo acid may also be an ester compound in which hydrogen of a hydroxyl group (—OH) bonded to a phosphorus atom is substituted with an organic group. The organic group may be a hydrocarbon group such as a methyl group and an ethyl group. Among them, phosphoric acid and phosphonic acid are preferable, and phosphonic acid is more preferable. The phosphorus oxo acid can form a phosphorus atom-containing film on the positive composite (positive active material). In addition, the peak position of the phosphorus atom (P2p) derived from the phosphorus oxo acid in the above-mentioned spectrum appears at 134.7 eV or less.

The lower limit of the mixing amount of the phosphorus oxo acid in the positive composite paste is preferably 0.05 parts by mass, more preferably 0.1 parts by mass, still more preferably 0.2 parts by mass, further preferably 0.3 parts by mass, even more preferably 0.5 parts by mass based on 100 parts by mass of the positive active material such as the lithium-transition metal composite oxide. On the other hand, the upper limit of the mixing amount is preferably 5 parts by mass, more preferably 3 parts by mass, still more preferably 2 parts by mass. The phosphorus oxo acid in a mixing amount equal to or more than the lower limit can form a film containing sufficient phosphorus for the positive active material. On the other hand, the phosphorus oxo acid in a mixing amount equal to or less than the upper limit can suppress a decrease in discharge capacity due to formation of a thick film.

The positive composite paste usually contains an organic solvent as a dispersion medium. Examples of the organic solvent include polar solvents such as N-methyl-2-pyrrolidone (NMP), acetone, and ethanol, and nonpolar solvents such as xylene, toluene, and cyclohexane. Polar solvents are preferable, and NMP is more preferable.

The method for applying the positive composite paste is not particularly limited, and the positive composite paste can be applied by a publicly known method such as roller coating, screen coating, and spin coating.

(Nonaqueous Electrolyte Injection Step)

The nonaqueous electrolyte injection step can be performed by a publicly known method. That is, it is possible to prepare a nonaqueous electrolyte having a desired composition, and inject the prepared nonaqueous electrolyte into a case. The composition of the nonaqueous electrolyte is as described above. For example, the nonaqueous electrolyte may be a nonaqueous electrolyte containing a fluorinated carbonate and having a content of the fluorinated carbonate of 15 mass % or less.

(Initial Charge Step)

In the initial charge step, the nonaqueous electrolyte energy storage device before the initial charge, which includes the positive electrode before the initial charge formed in the positive electrode production step, is initially charged. That is, a nonaqueous electrolyte energy storage device including the positive electrode is produced by the initial charge. The nonaqueous electrolyte energy storage device before the initial charge includes, in addition to the positive electrode, a negative electrode, a nonaqueous electrolyte, and the like.

The initial charge can be performed by applying a voltage between the positive electrode and the negative electrode before the initial charge of the electrode assembly, that is, by charging the positive electrode and the negative electrode. A nonaqueous electrolyte energy storage device can be obtained through the initial charge. In the case where graphite is used as the negative active material, the voltage applied in the initial charge can be, for example, 4.4 V or more and 5 V or less. That is, the potential of the positive electrode during the initial charge can be, for example, 4.5 V (vs. Li/Li$^+$) or more and 5.1 V (vs. Li/Li$^+$) or less. In the initial charge, a process of maintaining the charged state for a while (aging) may be performed.

The initial charge may be performed at normal temperature, but is preferably performed in a temperature environment of 35° C. or higher. As a result, the peak height ratio (Mn2p$_{3/2}$/P2p) can be further reduced, and an energy storage device having good discharge capacity retention ratio, and high rate discharge performance can be obtained. The upper limit of the temperature during the initial charge can be, for example, 80° C., and is preferably 60° C.

The method for producing the nonaqueous electrolyte energy storage device may include, in addition to the above-mentioned steps, a step of producing a negative electrode, a step of preparing a nonaqueous electrolyte, a step of producing an electrode assembly in which positive electrodes and negative electrodes are alternately superimposed on each other by stacking or winding the positive electrode and the negative electrode with a separator interposed therebetween, a step of housing the positive electrode and the negative electrode (electrode assembly) in a case, and the like.

OTHER EMBODIMENTS

The present invention is not limited to the above-mentioned embodiment, and can be implemented in aspects with various modifications and improvements besides the above-mentioned aspects. For example, in the positive electrode or the negative electrode, it is not necessary to provide an intermediate layer. In addition, in the positive electrode of the nonaqueous electrolyte energy storage device, it is not necessary that the positive composite form a clear layer. For example, the positive electrode may have a structure in which a positive composite is supported on a mesh-like positive electrode substrate.

In the above-mentioned embodiment, a mode in which the nonaqueous electrolyte energy storage device is a nonaqueous electrolyte secondary battery has been mainly described, but other nonaqueous electrolyte energy storage devices may also be used. Examples of other nonaqueous electrolyte energy storage devices include capacitors (electric double layer capacitors and lithium ion capacitors).

FIG. 1 is a schematic view of a rectangular nonaqueous electrolyte energy storage device 1 (nonaqueous electrolyte secondary battery) that is one embodiment of the nonaqueous electrolyte energy storage device according to the present invention. The diagram is a perspective view of the inside of a case. In the nonaqueous electrolyte energy storage device 1 shown in FIG. 1, an electrode assembly 2 is housed in a battery case 3 (case). The electrode assembly 2 is formed by winding a positive electrode having a positive composite containing a positive active material and a negative electrode containing a negative active material with a separator interposed therebetween. The positive electrode is electrically connected to a positive electrode terminal 4 via a positive electrode lead 4', while the negative electrode is electrically connected to a negative electrode terminal 5 via a negative electrode lead 5'. Details of the positive composite are as described above. In addition, a nonaqueous electrolyte is injected into the battery case 3.

Figure 2:
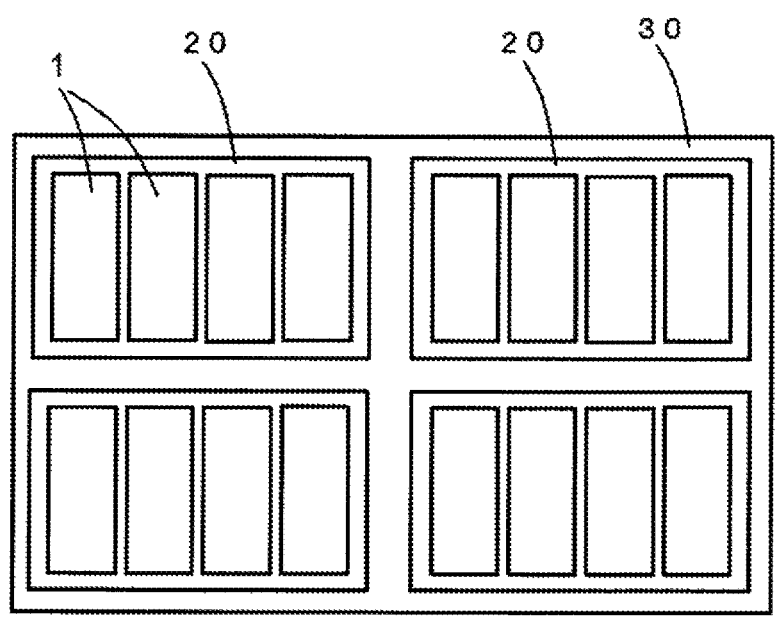
FIG. 2 is a schematic view showing an energy storage apparatus formed by aggregating a plurality of nonaqueous electrolyte energy storage devices according to one embodiment of the present invention.

The structure of the nonaqueous electrolyte energy storage device according to the present invention is not particularly limited, and examples of the structure include a cylindrical battery, a prismatic battery (rectangular battery), and a flat battery. The present invention can also be implemented as an energy storage apparatus having a plurality of nonaqueous electrolyte energy storage devices described above. FIG. 2 shows one embodiment of an energy storage apparatus. In FIG. 2, an energy storage apparatus 30 includes a plurality of energy storage units 20. Each of the energy storage units 20 includes a plurality of nonaqueous electrolyte energy storage devices 1. The energy storage apparatus 30 can be used as an automotive power supply for electric vehicles (EVs), hybrid electric vehicles (HEVs), plug-in hybrid electric vehicles (PHEVs), and the like.

EXAMPLES

Hereinafter, the present invention will be described more specifically with reference to examples, but the present invention is not limited to the following examples.

Example 1

(Production of Positive Electrode)

As a positive active material, a lithium-transition metal composite oxide derived from a carbonate precursor, which has an $\alpha$-NaFeO$_2$ type crystal structure and is represented by a composition formula $Li_{1.18}Ni_{0.10}Co_{0.17}Mn_{0.55}O_2$, was used. The positive active material had a BET specific surface area of 7.1 m$^2$/g, a tapped density of 2.0 g/cm$^3$, a value at which the volume-based cumulative distribution calculated in accordance with JIS-Z-8819-2 (2001) is 10% (D10) of 10 µm, a D50 of 12 µm, and a value at which the volume-based cumulative distribution is 90% (D90) of 16 µm. NMP was used as a dispersion medium, and $Li_{1.18}Ni_{0.10}Co_{0.17}Mn_{0.55}O_2$ (LR) as a positive active material, AB as a conductive agent, and PVDF as a binder were mixed at a mass ratio of 94:4.5:1.5 in terms of solid content. To the mixture, 1 mass % of phosphonic acid ($H_3PO_3$) based on the mass of the positive active material was added as an additive to produce a positive composite paste. The positive composite paste was applied to one surface of a 15 µm-thick aluminum foil piece as a positive electrode substrate, and dried at 100° C. to form a positive composite on the positive electrode substrate. The application amount of the positive composite paste was 0.0140 g/cm$^2$ in solid content. The positive composite density was 2.4 g/cms. Thus, a positive electrode having an area of the positive composite of 12 cm$^2$ was obtained.

(Production of Negative Electrode)

A negative composite paste was produced using graphite as a negative active material, styrene-butadiene rubber as a binder, CMC, and water as a dispersion medium. The mass ratio between the negative active material, the binder, and CMC was 97:2:1. The negative composite paste was applied to one surface of a 10 µm-thick copper foil piece as a negative electrode substrate, and dried at 100° C. The application amount of the negative composite was 0.0115 g/cm$^2$ in solid content. Thus, a negative electrode having an area of the negative composite of 13.4 cm$^2$ was obtained.

(Preparation of Nonaqueous Electrolyte)

Lithium hexafluorophosphate (LiPF$_6$) was dissolved at a concentration of 1.0 mol/L in a mixed solvent of EC and EMC at a volume ratio of 3:7 to prepare a nonaqueous electrolyte.

(Production of Nonaqueous Electrolyte Energy Storage Device)

As a separator, a separator having an inorganic layer formed on one surface of a polyolefin microporous film containing polyethylene and polypropylene was used. The positive electrode and the negative electrode were stacked with the separator interposed therebetween to produce an electrode assembly. The electrode assembly was housed in a case made of a metal-resin composite film, the nonaqueous electrolyte was injected into the case, and then the case was sealed by thermal welding to produce a nonaqueous electrolyte energy storage device (secondary battery) of Example 1 as a small laminate cell.

Example 2 and Comparative Examples 1 and 2

The same procedure as in Example 1 was performed except that the type of the positive active material used and the amount (presence or absence) of the additive in the production of the positive composite paste, the application amount of the positive composite paste, and the positive composite density were as shown in Table 1 to produce nonaqueous electrolyte energy storage devices of Example 2 and Comparative Examples 1 and 2.

The notation "-" in the column of additive in the table indicates that the relevant additive was not used. "LR" represents a lithium-transition metal composite oxide having an $\alpha$-NaFeO$_2$ type crystal structure and represented by $Li_{1.18}Ni_{0.10}Co_{0.17}Mn_{0.55}O_2$, and "NCM" represents a lithium-transition metal composite oxide having an $\alpha$-NaFeO$_2$ type crystal structure and represented by $LiNi_{1/3}Co_{1/3}Mn_{1/3}O_2$. NCM had a BET specific surface area of 1.0 m$^2$/g, a tapped density of 2.2 g/cm$^3$, a D10 of 5 µm, a D50 of 10 µm, and a D90 of 19 µm.

TABLE 1

| | Positive active material | Additive | Application amount (g/cm$^2$) | Positive composite density (g/cm$^3$) |
|---|---|---|---|---|
| Example 1 | LR | H$_3$PO$_3$ (1 wt %) | 0.0140 | 2.4 |
| Comparative Example 1 | LR | — | 0.0140 | 2.4 |
| Example 2 | NCM | H$_3$PO$_3$ (1 wt %) | 0.0180 | 2.8 |
| Comparative Example 2 | NCM | — | 0.0180 | 2.8 |

[Evaluation]

(Initial Formation)

Each of the obtained nonaqueous electrolyte energy storage devices was subjected to initial formation (initial charge) under the following conditions.

(LR/Gr Cell)

The devices (LR/Gr cells) of Example 1 and Comparative Example 1 were charged at a constant current of 0.1 C to 4.5 V and then charged at a constant voltage of 4.5 V in a thermostat at 25° C. The charge was terminated when the charge current reached 0.02 C. After a pause time of 10 minutes, the devices were discharged at a constant current of 0.1 C to 2.0 V. Then, after a pause time of 10 minutes, the devices were charged at a constant current of 0.1 C to 4.35 V and then charged at a constant voltage of 4.35 V. The charge was terminated when the charge current reached 0.02 C. After a pause time of 10 minutes, the devices were discharged at a constant current of 0.1 C to 2.0 V. Then, after a pause time of 10 minutes, the devices were charged at a constant current of 0.1 C to 4.35 V and then charged at a constant voltage of 4.35 V. The charge was terminated when the charge current reached 0.02 C. After a pause time of 10 minutes, the devices were discharged at a constant current of 1 C to 2.0 V.

(NCM/Gr Cell)

The devices (NCM/Gr cells) of Example 2 and Comparative Example 2 were charged at a constant current of 0.1 C to 4.35 V and then charged at a constant voltage of 4.35 V in a thermostat at 25° C. The charge was terminated when the charge current reached 0.02 C. Then, the devices were discharged at a constant current of 0.1 C to 2.0 V. The charge-discharge was repeated a total of three times. However, in the third discharge, the devices were discharged at a constant current of 1 C to 2.75 V. A pause time of 10 minutes was taken each time between charge and discharge.

(XPS Measurement)

Each nonaqueous electrolyte energy storage device in an end-of-discharge state after the initial formation was disassembled in an argon atmosphere with a dew point of −60° C. or lower, and the positive electrode was taken out, washed with dimethyl carbonate, and dried under reduced pressure at normal temperature. The obtained positive electrode was sealed in a transfer vessel in an argon atmosphere, and the surface of the positive composite of the positive electrode was subjected to the XPS measurement under the above-mentioned conditions. From the obtained spectrum, the peak position for P2p was determined by the above-mentioned method. The obtained peak position for P2p is shown in Table 2.

(Charge-Discharge Cycle Test)

Each nonaqueous electrolyte energy storage device after the initial formation was subjected to a charge-discharge cycle test under the following conditions.

(LR/Gr Cell)

The following cycle test was performed in a thermostat at 45° C. The devices were charged at a constant current of 0.1 C to 4.35 V and then charged at a constant voltage of 4.35 V. The charge was terminated when the charge current reached 0.02 C. After a pause time of 10 minutes, the devices were discharged at a constant current of 1 C to 2.0 V. This step of charge and discharge was regarded as one cycle, and the cycle was repeated 50 times.

(NCM/Gr Cell)

The following cycle test was performed in a thermostat at 45° C. The devices were charged at a constant current of 0.1 C to 4.35 V and then charged at a constant voltage of 4.35 V. The charge was terminated when the charge current reached 0.02 C. After a pause time of 10 minutes, the devices were discharged at a constant current of 1 C to 2.75 V. This step of charge and discharge was regarded as one cycle, and the cycle was repeated 50 times.

For each energy storage device, the discharge capacity at the 50th cycle, and the capacity retention ratio, which is the discharge capacity at the 50th cycle relative to the discharge capacity before the charge-discharge cycle test, were determined. The discharge capacity retention ratio at the 50th cycle is shown in Table 2.

TABLE 2

| | Capacity retention ratio (%) | Peak position for P2p (ev) |
|---|---|---|
| Example 1 (LR-H$_3$PO$_3$) | 93.1 | 134.3 |
| Comparative Example 1 (LR) | 51.0 | 136.9 |
| Example 2 (NCM-H$_3$PO$_3$) | 97.9 | 133.1 |
| Comparative Example 2 (NCM) | 93.9 | 134.8 |

As shown in Table 2, it is understood that use of a positive composite containing phosphonic acid that is a phosphorus oxo acid increases the discharge capacity retention ratio, and that this effect is particularly prominent when phosphonic acid is added to a lithium-excess type positive active material. Further, as shown in Table 2, it can be understood that in the XPS spectrum of the positive composite containing a phosphorus oxo acid, the peak position for P2p appears at 134.7 eV or less.

Example 3

(Production of Positive Electrode Before Initial Charge)

As a positive active material, a lithium-transition metal composite oxide derived from a carbonate precursor, which has an α-NaFeO$_2$ type crystal structure and is represented by a composition formula Li$_{1.18}$Ni$_{0.10}$Co$_{0.17}$Mn$_{0.55}$O$_2$, was used. The positive active material had a BET specific surface area of 7.1 m$^2$/g, a tapped density of 2.0 g/cm$^3$, a value at which the volume-based cumulative distribution calculated in accordance with JIS-Z-8819-2 (2001) is 10% (D10) of 10 μm, a D50 of 12 μm, and a value at which the volume-based cumulative distribution is 90% (D90) of 16 μm. NMP was used as a dispersion medium, and a lithium-transition metal composite oxide as a positive active material, AB as a conductive agent, and PVDF as a binder were mixed at a mass ratio of 94:4.5:1.5 in terms of solid content. To the mixture, 1 mass % of phosphonic acid (H$_3$PO$_3$) based on the mass of the positive active material was added as an additive to produce a positive composite paste. The positive composite paste was applied to one surface of an aluminum foil piece as a positive electrode substrate, and dried at 100° C. to form a positive composite on the positive electrode substrate. The application amount of the positive composite paste was 13.5 mg/cm$^2$ in solid content. The positive composite density was 2.4 g/cm$^3$. Thus, the positive electrode before the initial charge was obtained.

(Production of Negative Electrode)

A negative composite paste was produced using graphite as a negative active material, styrene-butadiene rubber as a binder, and water as a dispersion medium. The mass ratio between the negative active material and the binder was 97:3. The negative composite paste was applied to one surface of a copper foil piece as a negative electrode substrate, and dried at 100° C. The application amount of the negative composite was 11.5 mg/cm$^2$ in solid content. Thus, a negative electrode was obtained.

(Preparation of Nonaqueous Electrolyte)

LiPF$_6$ was dissolved at a concentration of 1.0 mol/L in a mixed solvent of EC and EMC at a volume ratio of 3:7 to prepare a nonaqueous electrolyte.

(Production of Nonaqueous Electrolyte Energy Storage Device Before Initial Charge-Discharge)

As a separator, a separator having an inorganic layer formed on one surface of a polyolefin microporous film containing polyethylene and polypropylene was used. The positive electrode and the negative electrode before the initial charge were stacked with the separator interposed therebetween to produce an electrode assembly. The electrode assembly was housed in a case made of a metal-resin composite film, the nonaqueous electrolyte was injected into the case, and then the case was sealed by thermal welding to assemble a nonaqueous electrolyte energy storage device before the initial charge-discharge as a small laminate cell.

(Initial Charge-Discharge)

The assembled nonaqueous electrolyte energy storage device before the initial charge-discharge was subjected to initial charge-discharge under the following conditions. The device was charged at a constant current of 0.1 C to 4.50 V and then charged at a constant voltage of 4.50 V at 25° C. The charge was terminated when the charge current reached 0.02 C. The positive electrode potential then was 4.60 V (vs. Li/Li$^+$). After charge, a pause of 10 minutes was provided, and then the device was discharged at a constant current of 0.1 C to 2.00 V at 25° C. Through the initial charge-discharge step, a nonaqueous electrolyte energy storage device (secondary battery) of Example 3 was completed. The initial charge-discharge was performed in a thermostat at 25° C.

Examples 4 to 6

The same procedure as in Example 3 was performed except that the temperature (formation temperature) in the initial charge-discharge was as shown in Table 3 to produce nonaqueous electrolyte energy storage devices of Examples 4 to 6.

Comparative Examples 3 to 6

The same procedure as in Example 3 was performed except that phosphonic acid was not added in the production of the positive composite paste, and that the temperature in the initial charge-discharge was as shown in Table 3 to produce nonaqueous electrolyte energy storage devices of Comparative Examples 3 to 6.

Comparative Example 71

The same procedure as in Example 3 was performed except that phosphonic acid was not added in the production of the positive composite paste, that tris(trimethylsilyl) phosphate (TMSP) was added to the nonaqueous electrolyte at a concentration of 1 mass %, and that the temperature in the initial charge-discharge was as shown in Table 3 to produce a nonaqueous electrolyte energy storage device of Comparative Example 7.

[Evaluation]

(Discharge Capacity Confirmation Test)

Each of the obtained nonaqueous electrolyte energy storage devices completed through the above-mentioned procedure was subjected to an initial capacity confirmation test under the following conditions. The device was charged at a constant current of 0.1 C to 4.35 V and then charged at a constant voltage of 4.35 V at 25° C. The charge was terminated when the charge current reached 0.02 C. The positive electrode potential at the end of charge was 4.45 V (vs. Li/Li$^+$). After charge, a pause of 10 minutes was provided, and then the device was discharged at a constant current of 1 C to 2.00 V at 25° C. In this way, the initial discharge capacity was measured. The discharge capacity at 1 C per mass of the positive active material is shown in Table 3.

(XPS Measurement)

About each of the nonaqueous electrolyte energy storage devices in an end-of-discharge state after the initial capacity confirmation test, the XPS measurement of the positive composite surface of the positive electrode was performed by the same procedure as in the above-mentioned method. From the obtained spectrum, the peak position and the peak height for P2p, and the peak height for $Mn2p_{3/2}$ were determined by the above-mentioned method. Moreover, the peak height ratio ($Mn2p_{3/2}$/P2p) of $Mn2p_{3/2}$ to P2p was determined from the peak heights. The obtained peak position for P2p and peak height ratio ($Mn2p_{3/2}$/P2p) are shown in Table 3.

(High Rate Discharge Performance Test: Discharge Capacity Ratio)

The discharge capacity of each of the nonaqueous electrolyte energy storage devices at 0.1 C was measured in the same manner as in the above-mentioned discharge capacity confirmation test except that the device was discharged at a constant current of 0.1 C. From this measured value and the measured value of the discharge capacity at 1 C in the discharge capacity confirmation test, the discharge capacity ratio between these values, (discharge capacity at 1 C/discharge capacity at 0.1 C)×100(%), was determined as an index of high rate discharge performance. The value is shown in Table 3.

(Charge-Discharge Cycle Test: Capacity Retention Ratio)

Each of the nonaqueous electrolyte energy storage devices was stored in a thermostat at 45° C. for 2 hours, then charged at a constant current of 1 C to 4.35 V, and then charged at a constant voltage of 4.35 V. The charge was terminated when the charge current reached 0.02 C. After charge, a pause of 10 minutes was provided, and then the device was discharged at a constant current of 1 C to 2.00 V. This step of charge and discharge was regarded as one cycle, and the cycle was repeated 40 times. All of the charge, discharge, and pause were performed in the thermostat at 45° C.

For each nonaqueous electrolyte energy storage device after the charge-discharge cycle test, the ratio between the discharge capacity after 40 cycles and the discharge capacity after 1 cycle in the charge-discharge cycle test is shown in Table 3 as the capacity retention ratio (%). The notation "—" in Table 3 indicates that the capacity retention ratio was not measured.

TABLE 3

| | Additive (positive composite paste) | Additive (nonaqueous electrolyte) | Formation temperature (° C.) | P2p peak position (eV) | Peak height ratio ($Mn2p_{3/2}$/P2p) | Discharge capacity (mAh/g) | Discharge capacity ratio (1 C/0.1 C) (%) | Capacity retention ratio (%) |
|---|---|---|---|---|---|---|---|---|
| Example 3 | $H_3PO_3$ | — | 25 | 134.0 | 1.05 | 203 | 92.1 | 93 |
| Example 4 | $H_3PO_3$ | — | 35 | 134.0 | 0.98 | 206 | 93.6 | — |
| Example 5 | $H_3PO_3$ | — | 45 | 134.0 | 0.89 | 205 | 93.2 | 93 |
| Example 6 | $H_3PO_3$ | — | 60 | 134.1 | 0.95 | 204 | 93.6 | 93 |
| Comparative Example 3 | — | — | 25 | 136.9 | 18.2 | 203 | 90.4 | 69 |
| Comparative Example 4 | — | — | 35 | 136.6 | 10.1 | 204 | 91.5 | — |
| Comparative Example 5 | — | — | 45 | 135.1 | 10.2 | 195 | 89.4 | 54 |
| Comparative Example 6 | — | — | 60 | 136.0 | 4.9 | 136 | 64.3 | — |
| Comparative Example 7 | — | TMSP | 45 | 135.2 | 6.37 | 206 | 93.7 | 89 |

As shown in Table 3, it is understood that the nonaqueous electrolyte energy storage devices of Examples 3, 5, and 6 containing a positive composite paste containing phosphonic acid each had a high capacity retention ratio more than 90%. In these nonaqueous electrolyte energy storage devices, in the XPS spectrum, the peak height ratio (Mn2p$_{3/2}$/P2p) of Mn2p$_{3/2}$ to P2p was 2 or less. Moreover, in these nonaqueous electrolyte energy storage devices, in the XPS spectrum, the peak position for P2p appeared at 134.5 eV or less. It can be understood that use of a positive composite paste containing phosphonic acid gives such an XPS spectrum. Although the capacity retention ratio was not measured in Example 4, it is clear from the production conditions and XPS spectrum that the nonaqueous electrolyte energy storage device of Example 4 has high capacity retention ratio similarly to the devices of other examples. Further, as in Examples 4 to 6, performing the initial charge in an environment of 35° C. or higher can provide an energy storage device having high capacity retention ratio as well as high discharge capacity and improved high rate discharge performance. Moreover, initial charge performed in an environment of 35° C. or higher provides a peak height ratio (Mn2p$_{3/2}$/P2p) of 1 or less.

It is also understood that the nonaqueous electrolyte energy storage devices had low capacity retention ratio in Comparative Examples 3 and 5 in which phosphonic acid was not added to the positive composite paste, and in Comparative Example 7 in which phosphonic acid was not added to the positive composite paste and TMSP containing a phosphorus atom was added to the nonaqueous electrolyte. In the XPS spectrum in these examples, the peak height ratio (Mn2p$_{3/2}$/P2p) of Mn2p, to P2p was out of the range of 2 or less. Moreover, the peak position for P2p did not appear within the range of 134.5 eV or less. That is, it is believed that when the positive electrode paste does not contain a phosphorus oxo acid such as phosphonic acid or any other component that contains phosphorus, no XPS spectrum satisfying the above-mentioned peak height ratio and peak position is obtained, and no film capable of increasing the capacity retention ratio is formed. Further, from the results of Comparative Example 7, it can be inferred that even if a component containing a phosphorus atom is added to the nonaqueous electrolyte, no film capable of sufficiently increasing the capacity retention ratio is formed. It can also be understood that the devices of Comparative Examples 3 to 6 in which no phosphonic acid was added to the positive composite paste had low high rate discharge performance.

Example 7

(Production of Positive Electrode)

As a positive active material, a lithium-transition metal composite oxide derived from a carbonate precursor, which has an α-NaFeO$_2$ type crystal structure and is represented by a composition formula Li$_{1.18}$Ni$_{0.10}$Co$_{0.17}$Mn$_{0.55}$O$_2$, was used. The positive active material had a BET specific surface area of 7.1 m$^2$/g, a tapped density of 2.0 g/cm$^3$, a value at which the volume-based cumulative distribution calculated in accordance with JIS-Z-8819-2 (2001) is 10% (D10) of 10 μm, a D50 of 12 μm, and a value at which the volume-based cumulative distribution is 90% (D90) of 16 μm. NMP was used as a dispersion medium, and Li$_{1.18}$Ni$_{0.10}$Co$_{0.17}$Mn$_{0.55}$O$_2$ as a positive active material, AB as a conductive agent, and PVDF as a binder were mixed at a mass ratio of 94:4.5:1.5 in terms of solid content. To the mixture, 1 mass % of phosphonic acid (H$_3$PO$_3$) and 0.1 mass % of calcium hydroxide particles based on the mass of the positive active material were individually added as additives in this order, and then the resulting product was further mixed to produce a positive composite paste. The positive composite paste was applied to one surface of a 15 μm-thick aluminum foil piece as a positive electrode substrate, and dried at 100° C. to form a positive composite on the positive electrode substrate. The application amount of the positive composite paste was 1.35 g/100 cm$^2$ in solid content. The positive composite density was 2.4 g/cm$^3$. Thus, a positive electrode was obtained.

(Production of Negative Electrode)

A negative composite paste was produced using graphite as a negative active material, styrene-butadiene rubber as a binder, CMC, and water as a dispersion medium. The mass ratio between the negative active material and the binder was 97:3. The negative composite paste was applied to one surface of a 10 μm-thick copper foil piece as a negative electrode substrate, and dried at 100° C. The application amount of the negative composite was 1.15 g/100 cm$^2$ in solid content. Thus, a negative electrode was obtained.

(Preparation of Nonaqueous Electrolyte)

LiPF$_6$ was dissolved at a concentration of 1.0 mol/L in a mixed solvent of EC and EMC at a volume ratio of 3:7 to prepare a nonaqueous electrolyte.

(Production of Nonaqueous Electrolyte Energy Storage Device)

A polyolefin microporous film was used as a separator. The positive electrode and the negative electrode were stacked with the separator interposed therebetween to produce an electrode assembly. The electrode assembly was housed in a case made of a metal-resin composite film, the nonaqueous electrolyte was injected into the case, and then the case was sealed by thermal welding to produce a nonaqueous electrolyte energy storage device (secondary battery) of Example 7. The nonaqueous electrolyte in an amount at which the amount of the electrolyte salt was 1 mass % based on the amount of the positive active material was injected.

Examples 8 to 11 and Comparative Examples 8 and 9

The same procedure as in Example 7 was performed except that the type and amount of the additive used in the production of the positive composite paste were as shown in Table 4 to produce nonaqueous electrolyte energy storage devices of Examples 8 to 11 and Comparative Examples 8 and 9. The notation "-" in the column of additive in the table indicates that the relevant additive was not used.

[Evaluation]

(Peel Strength Test)

The peel strength test was performed by the following method in accordance with the method of 180° peel test described in JIS-K-6854-2: 1999. Each of the obtained positive electrodes was cut into a rectangle of 3 cm long and 4 cm wide to produce a sample for the peel strength test, and the sample was fixed to a jig of a peel tester. A mending tape piece (having a width of 15 mm) manufactured by 3M was attached to the sample, then the attached tape was peeled off, and the force required for peeling the tape was measured with a load meter. The peel rate was 100 mm/min. The peel tester used was "MH-100AC" manufactured by IMADA CO., LTD., and the load meter used was "Digital Force Gauge DS-20N" manufactured by IMADA CO., LTD. The measurement results are shown in Table 4.

Under these test conditions, a sample having a peel strength of 200 kgf or more can be judged as having high adhesion, and a sample having a peel strength of 220 kgf or more can be judged as having particularly high adhesion.
(Initial Formation)

Each of the obtained nonaqueous electrolyte energy storage devices was subjected to initial formation under the following conditions. The device was charged at a constant current of 3.2 mA to 4.50 V and then charged at a constant voltage of 4.50 V at 25° C. The charge was terminated when the charge current reached 0.6 mA. After charge, a pause of 10 minutes was provided, and then the device was discharged at a constant current of 3.2 mA to 2.00 V at 25° C.
(Initial Capacity Confirmation Test)

After the initial formation, the nonaqueous electrolyte energy storage device was subjected to an initial capacity confirmation test under the following conditions. The device was charged at a constant current of 3.2 mA to 4.40 V and then charged at a constant voltage of 4.40 V at 25° C. The charge was terminated when the charge current reached 0.6 mA. After charge, a pause of 10 minutes was provided, and then the device was discharged at a constant current of 3.2 mA to 2.00 V at 25° C. In this way, the initial discharge capacity (initial capacity) was measured.
(XPS Measurement)

About each of the nonaqueous electrolyte energy storage devices in an end-of-discharge state after the initial capacity confirmation test, the XPS measurement of the positive composite surface of the positive electrode was performed by the same procedure as in the above-mentioned method. From the obtained spectrum, the peak position for P2p was determined by the above-mentioned method. The obtained peak position for P2p is shown in Table 4.
(Charge-Discharge Cycle Test: Capacity Retention Ratio)

Each of the nonaqueous electrolyte energy storage devices after the initial capacity confirmation test was stored in a thermostat at 45° C. for 2 hours, then charged at a constant current of 32 mA to 4.40 V, and then charged at a constant voltage of 4.40 V (CCCV). The charge was terminated when the charge current reached 0.6 mA. After charge, a pause of 10 minutes was provided, and then the device was discharged at a constant current (CC) of 32 mA to 2.00 V. This step of charge and discharge was regarded as one cycle, and the cycle was repeated 100 times. All of the charge, discharge, and pause were performed in the thermostat at 45° C.

Each of the nonaqueous electrolyte energy storage devices after the charge-discharge cycle test was subjected to a capacity confirmation test after the cycle test in the same manner as in the initial capacity confirmation test. The discharge capacity after the cycle test relative to the initial discharge capacity is shown in Table 4 as the capacity retention ratio (%).

Under these test conditions, a sample having a capacity retention ratio of 80% or more can be judged as having high capacity retention ratio.
(Storage Test: Capacity Retention Ratio)

Each of the nonaqueous electrolyte energy storage devices after the initial capacity confirmation test was stored in a thermostat at 25° C. for 2 hours, then charged at a constant current of 3.2 mA to 4.40 V, and then charged at a constant voltage of 4.40 V (CCCV). The charge was terminated when the charge current reached 0.6 mA. After charge, the device was stored in a thermostat at 45° C. for 7 days. Then, after the device was stored in a thermostat at 25° C. for 2 hours, constant current (CC) discharge was performed at 3.2 mA to 2.00 V. The discharge capacity then is taken as the discharge capacity after the storage test.

The discharge capacity after the storage test relative to the initial discharge capacity is shown in Table 4 as the capacity retention ratio (%).

Under these test conditions, a sample having a capacity retention ratio of 87% or more can be judged as having high capacity retention ratio.

TABLE 4

| | Additive | | P2p peak position eV | Peel strength kgf | Capacity retention ratio (after 100 cycles) % | Capacity retention ratio (after storage) % |
|---|---|---|---|---|---|---|
| Comparative Example 8 | — | — | 136.9 | 229 | 52.7 | 86.0 |
| Comparative Example 9 | — | Ca(OH)$_2$ particles: 1.0 wt % | 137.1 | 215 | 64.4 | 85.3 |
| Example 7 | H$_3$PO$_3$: 1 wt % | Ca(OH)$_2$ particles: 0.1 wt % | 134.4 | 225 | 87.1 | 88.2 |
| Example 8 | H$_3$PO$_3$: 1 wt % | Ca(OH)$_2$ particles: 0.3 wt % | 133.8 | 235 | 87.2 | 88.5 |
| Example 9 | H$_3$PO$_3$: 1 wt % | Ca(OH)$_2$ particles: 0.5 wt % | 133.5 | 222 | 88.0 | 89.0 |
| Example 10 | H$_3$PO$_3$: 1 wt % | Ca(OH)$_2$ particles: 1.0 wt % | 133.8 | 234 | 87.3 | 87.3 |
| Example 11 | H$_3$PO$_3$: 1 wt % | — | 134.3 | 179 | 87.1 | 87.5 |

As shown in Table 4, it can be understood that the nonaqueous electrolyte energy storage devices of Examples 7 to 10 have high adhesion between the positive composite and the substrate, and also have high capacity retention ratio after charge-discharge cycles at high voltage and after being stored in a charged state. It can also be understood that, in Example 11 in which only phosphonic acid was added as an additive, although the nonaqueous electrolyte energy storage device has high capacity retention ratio, it has low peel strength and insufficient adhesion between the positive composite and the substrate. Meanwhile, it can be understood that, in Comparative Example 8 in which no additive was used and in Comparative Example 9 in which only calcium hydroxide was added, the nonaqueous electrolyte energy storage device has low capacity retention ratio.

Example 12

(Production of Positive Electrode)

As a positive active material, a lithium-transition metal composite oxide derived from a carbonate precursor, which has an α-NaFeO$_2$ type crystal structure and is represented by a composition formula Li$_{1.18}$Ni$_{0.10}$Co$_{0.17}$Mn$_{0.55}$O$_2$, was used. The positive active material had a BET specific surface area of 7.1 m²/g, a tapped density of 2.0 g/cm³, a value at which the volume-based cumulative distribution calculated in accordance with JIS-Z-8819-2 (2001) is 10% (D10) of 10 μm, a D50 of 12 μm, and a value at which the volume-based cumulative distribution is 90% (D90) of 16 μm. NMP was used as a dispersion medium, and $Li_{1.18}Ni_{0.10}Co_{0.17}Mn_{0.55}O_2$ as a positive active material, AB as a conductive agent, and PVDF as a binder were mixed at a mass ratio of 94:4.5:1.5 in terms of solid content. To the mixture, 1 mass % of phosphonic acid ($H_3POa$) based on the mass of the positive active material was added as an additive, and the resulting product was further mixed to produce a positive composite paste. The positive composite paste was applied to one surface of a 15 μm-thick aluminum foil piece as a positive electrode substrate, and dried at 100° C. to form a positive composite on the positive electrode substrate. The application amount of the positive composite paste was 1.35 g/100 cm² in solid content. The positive composite density was 2.4 g/cm³. Thus, a positive electrode was obtained.

(Production of Negative Electrode)

A negative composite paste was produced using graphite as a negative active material, styrene-butadiene rubber as a binder, CMC, and water as a dispersion medium. The mass ratio between the negative active material and the binder was 97:3. The negative composite paste was applied to one surface of a 10 μm-thick copper foil piece as a negative electrode substrate, and dried at 100° C. The application amount of the negative composite was 1.15 g/100 cm² in solid content. Thus, a negative electrode was obtained.

(Preparation of Nonaqueous Electrolyte)

FEC as an additive and $LiPF_6$ as an electrolyte salt were dissolved at concentrations of 2 mass % and 1.0 mol/L, respectively, in a mixed solvent of EC and EMC at a volume ratio of 30:70 to prepare a nonaqueous electrolyte.

(Production of Nonaqueous Electrolyte Energy Storage Device)

A polyolefin microporous film having an inorganic layer applied thereto was used as a separator. The positive electrode and the negative electrode were stacked with the separator interposed therebetween to produce an electrode assembly. The electrode assembly was housed in a case made of a metal-resin composite film, the nonaqueous electrolyte was injected into the case, and then the case was sealed by thermal welding to produce a nonaqueous electrolyte energy storage device (secondary battery) of Example 12.

Examples 13 to 20 and Comparative Examples 10 and 11

The same procedure as in Example 12 was performed except that the type of the additive used in the production of the positive composite paste, as well as the nonaqueous solvents and the volume ratio between the nonaqueous solvents, and the type and amount of the additive used in the preparation of the nonaqueous electrolyte were as shown in Table 5 to produce nonaqueous electrolyte energy storage devices of Examples 13 to 20 and Comparative Examples 10 and 11. The notation "-" in the column of additive in the table indicates that the relevant additive was not used.

The additives to the nonaqueous electrolytes in Table 5 represent the following compounds.
FEC: fluoroethylene carbonate
PRS: 1,3-propenesultone
FMP: methyl trifluoropropionate
VC: vinylene carbonate
LiBOB: $LiB(C_2O_4)_2$

[Evaluation]

(Initial Charge-Discharge)

Each of the obtained nonaqueous electrolyte energy storage devices was subjected to initial charge-discharge under the following conditions. The device was charged at a constant charge current of 0.1 C (3.2 mA) to 4.50 V and then charged at a constant voltage of 4.50 V (CCCV) at 25° C. The charge was terminated when the charge current reached 0.05 C. After charge, a pause of 10 minutes was provided, and then the device was discharged at a constant current (CC) of 0.1 C to 2.00 V at 25° C.

(XPS Measurement)

About each of the nonaqueous electrolyte energy storage devices in an end-of-discharge state after the initial charge-discharge, the peak position for P2p was determined by the same procedure as in the above-mentioned method. The obtained peak position for P2p is shown in Table 5. The notation "-" in the column of P2p peak position in the table indicates that the measurement was not performed.

(Charge-Discharge Cycle Test at 45° C.: Capacity Retention Ratio)

Each of the nonaqueous electrolyte energy storage devices after the initial charge-discharge was stored in a thermostat at 45° C. for 2 hours, then charged at a constant charge current of 1 C (32 mA) to 4.35 V and then charged at a constant voltage of 4.35 V. The charge was terminated when the charge current reached 0.05 C. The positive electrode potential at the end of charge was 4.45 V (vs. Li/Li⁺). After charge, a pause of 10 minutes was provided, and then the device was discharged at a constant current of 1 C (32 mA) to 2.00 V. This step of charge and discharge was regarded as one cycle, and the cycle was repeated 50 times. All of the charge, discharge, and pause were performed in the thermostat at 45° C.

(Charge-Discharge Cycle Test at 0° C.: Capacity Retention Ratio)

Each of the nonaqueous electrolyte energy storage devices after the initial charge-discharge was stored in a thermostat at 0° C. for 2 hours, then charged at a constant charge current of 1 C (32 mA) to 4.35 V and then charged at a constant voltage of 4.35 V. The charge was terminated when the charge current reached 0.05 C. After charge, a pause of 10 minutes was provided, and then the device was discharged at a constant current of 1 C (32 mA) to 2.00 V. This step of charge and discharge was regarded as one cycle, and the cycle was repeated 50 times. All of the charge, discharge, and pause were performed in the thermostat at 0° C.

The discharge capacity at the 50th cycle relative to the discharge capacity at the 1st cycle in each of the charge-discharge cycle test at 45° C. and the charge-discharge cycle test at 0° C. is shown in Table 5 as the capacity retention ratio (%).

TABLE 5

| | Positive active material Additive | Nonaqueous electrolyte (1M LiPF$_6$) Nonaqueous solvent | Additive | P2p peak position (eV) | Capacity retention ratio (%) 45° C. | 0° C. |
|---|---|---|---|---|---|---|
| Example 12 | H$_3$PO$_3$ | EC/EMC (30/70) | FEC (2 mass %) | 134.1 | 94.3 | 93.5 |
| Example 13 | H$_3$PO$_3$ | EC/EMC/DMC (30/35/35) | FEC (2 mass %) | 134.1 | 93.7 | 93.4 |
| Example 14 | H$_3$PO$_3$ | EC/EMC (30/70) | FEC (10 mass %) | — | 93.2 | 92.9 |
| Example 15 | H$_3$PO$_3$ | EC/EMC (30/70) | PRS (2 mass %) | 134.0 | 94.6 | 69.0 |
| Example 16 | H$_3$PO$_3$ | EC/EMC (30/70) | FMP (2 mass %) | 133.9 | 93.7 | 91.6 |
| Example 17 | H$_3$PO$_3$ | EC/EMC (30/70) | VC (2 mass %) | 134.1 | 94.2 | 90.0 |
| Example 18 | H$_3$PO$_3$ | EC/EMC (30/70) | LiBOB (2 mass %) | 133.9 | 91.9 | 64.5 |
| Example 19 | H$_3$PO$_3$ | EC/EMC (30/70) | — | — | 93.7 | 92.1 |
| Example 20 | H$_3$PO$_3$ | EC/EMC (30/70) | FEC (20 mass %) | 133.9 | 92.6 | 89.4 |
| Comparative Example 10 | — | EC/EMC (30/70) | FEC (2 mass %) | 137.0 | 69.9 | 93.3 |
| Comparative Example 11 | Li$_3$PO$_4$ | EC/EMC (30/70) | FEC (2 mass %) | 137.0 | 12.7 | 83.0 |

As shown in Table 5, the nonaqueous electrolyte energy storage devices of Examples 12 to 14 containing a phosphorus oxo acid as the positive composite and also containing a predetermined amount of a fluorinated carbonate as a nonaqueous electrolyte showed good results, that is, the nonaqueous electrolyte energy storage devices each had a capacity retention ratio at the high temperature (45° C.) more than 93%, and a capacity retention ratio at the low temperature (0° C.) also more than 92.5%.

Moreover in Examples 15 to 18 in which H$_3$PO$_3$ was added to the positive composite and various additives including PRS, FMP, VC, and LiBOB were added to the nonaqueous electrolyte, Example 19 in which H$_3$PO$_3$ was added to the positive composite and no additive was added to the nonaqueous electrolyte, and Example 20 in which H$_3$PO$_3$ was added to the positive composite and the amount of the added FEC in the nonaqueous electrolyte was 20 mass %, although the energy storage devices had sufficient capacity retention ratio at high temperature, they had low capacity retention ratio at low temperature.

Meanwhile, in Comparative Example 10 in which no additive was added to the positive composite and 2 mass % of FEC was added to the nonaqueous electrolyte, the energy storage device had low capacity retention ratio at high temperature. In Comparative Example 10, it is presumed that increasing the amount of the added FEC improves the capacity retention ratio at high temperature to some extent. However, in this case, it is presumed that the capacity retention ratio at low temperature is lowered (see Example 20, for example). Also in Comparative Example 11 in which Li$_3$PO$_4$ was added to the positive composite and FEC was added to the nonaqueous electrolyte, the energy storage device did not exhibit good capacity retention ratio both in high-temperature and low-temperature environments.

As described above, the effect that the energy storage device is capable of exhibiting high capacity retention ratio in high-voltage charge-discharge cycles both in high-temperature and low-temperature environments is a particular effect that is exerted only when a phosphorus oxo acid is used in the positive composite and a predetermined amount of a fluorinated carbonate is used in the nonaqueous electrolyte among numerous additives.

INDUSTRIAL APPLICABILITY

The present invention is applicable to nonaqueous electrolyte energy storage devices used as power supplies for electronic devices such as personal computers and communication terminals, and automobiles.

DESCRIPTION OF REFERENCE SIGNS

1: Nonaqueous electrolyte energy storage device
2: Electrode assembly
3: Battery case
4: Positive electrode terminal
4': Positive electrode lead
5: Negative electrode terminal
5': Negative electrode lead
20: Energy storage unit
30: Energy storage apparatus

The invention claimed is:

1. A nonaqueous electrolyte energy storage device comprising a positive electrode having a positive composite that contains a phosphorus atom and a lithium-transition metal composite oxide containing manganese,
wherein, in a spectrum of the positive composite by X-ray photoelectron spectroscopy, a peak position for P2p is observed at 134.7 eV or less, and
in the spectrum of the positive composite, a peak height ratio (Mn2p$_{3/2}$/P2p) of Mn2p$_{3/2}$ to P2p is 1 or less.

2. The nonaqueous electrolyte energy storage device according to claim 1, wherein the lithium-transition metal composite oxide is represented by Li$_{1+\alpha}$Me$_{1-\alpha}$O$_2$ wherein Me is a transition metal element containing Mn, and $0 \leq \alpha < 1$.

3. The nonaqueous electrolyte energy storage device according to claim 2, wherein, in formula Li$_{1+\alpha}$Me$_{1-\alpha}$O$_2$, $\alpha > 0$, and a molar ratio (Mn/Me) of Mn to Me is larger than 0.5.

4. The nonaqueous electrolyte energy storage device according to claim 3,
wherein the lithium-transition metal composite oxide has an α-NaFeO$_2$ type crystal structure.

5. The nonaqueous electrolyte energy storage device according to claim 1, wherein the positive composite further contains a fluororesin binder and a basic substance.

6. The nonaqueous electrolyte energy storage device according to claim 5, wherein the basic substance is calcium-containing particles.

7. The nonaqueous electrolyte energy storage device according to claim 1, further comprising a nonaqueous electrolyte containing a fluorinated carbonate,
wherein the nonaqueous electrolyte has a content of the fluorinated carbonate of 15 mass % or less.

8. The nonaqueous electrolyte energy storage device according to claim 7, wherein the nonaqueous electrolyte further contains ethylene carbonate.

9. The nonaqueous electrolyte energy storage device according to claim 1, wherein, in normal use of the nonaqueous electrolyte energy storage device, the positive electrode has an end-of-charge potential of 4.35 V (vs. Li/Li$^+$) or more, the normal use referring to a case where the nonaqueous electrolyte energy storage device is used under charge conditions recommended or designated for the nonaqueous electrolyte energy storage device, and in a case where a charger for the nonaqueous electrolyte energy storage device is provided, the normal use referring to a case where the nonaqueous electrolyte energy storage device is used with the charger.

10. A nonaqueous electrolyte energy storage device comprising:
a positive electrode having a positive composite containing a phosphorus atom; and
a nonaqueous electrolyte containing a fluorinated carbonate,
wherein, in a spectrum of the positive composite by X-ray photoelectron spectroscopy, a peak position for P2p is observed at 134.7 eV or less, and
the nonaqueous electrolyte has a content of the fluorinated carbonate of 15 mass % or less.

11. A nonaqueous electrolyte energy storage device comprising a positive electrode having a positive composite that contains a lithium-transition metal composite oxide and a phosphorus atom,
wherein the lithium-transition metal composite oxide has an α-NaFeO$_2$ type crystal structure, a molar ratio (Li/Me) of lithium (Li) to a transition metal (Me) is larger than 1, the transition metal contains manganese (Mn), a molar ratio (Mn/Me) of manganese to the transition metal is larger than 0.5, and
in a spectrum of the positive composite by X-ray photoelectron spectroscopy, a peak height ratio (Mn2p$_{3/2}$/P2p) of Mn2p$_{3/2}$ to P2p is 1 or less.

12. The nonaqueous electrolyte energy storage device according to claim 1, wherein the positive electrode has an end-of-charge potential of 4.35 V (vs. Li/Li$^+$) or more, the end-of-charge potential is measured at an end of a charge in which the nonaqueous electrolyte energy storage device is charged at a constant current of 0.1 C to 4.35 V and then charged at a constant voltage of 4.35 V at 25° C. until a charge current reached 0.02 C.

* * * * *